( 12 ) United States Patent
Hahn

(10) Patent No.: US 10,003,422 B2
(45) Date of Patent: Jun. 19, 2018

(54) METHOD FOR PROCESSING AN FM STEREO SIGNAL

(71) Applicant: Hans-Peter Hahn, Griesheim (DE)

(72) Inventor: Hans-Peter Hahn, Griesheim (DE)

( * ) Notice: Subject to any disclaimer, the term of this patent is extended or adjusted under 35 U.S.C. 154(b) by 0 days. days.

(21) Appl. No.: 15/499,174

(22) Filed: Apr. 27, 2017

(65) Prior Publication Data

US 2017/0317772 A1 Nov. 2, 2017

(30) Foreign Application Priority Data

Apr. 27, 2016 (DE) .......................... 10 2016 107 799

(51) Int. Cl.
*H04H 20/48* (2008.01)
*H04H 20/88* (2008.01)
*G10L 21/0232* (2013.01)

(52) U.S. Cl.
CPC ......... *H04H 20/48* (2013.01); *G10L 21/0232* (2013.01); *H04H 20/88* (2013.01)

(58) Field of Classification Search
CPC ......... H04H 5/00; H04H 40/72; H04B 1/1676
USPC ..... 381/3, 2, 13, 10, 11, 94.3, 106; 455/311, 455/72, 314, 259, 304, 337; 704/205, 704/219, 262
See application file for complete search history.

(56) References Cited

U.S. PATENT DOCUMENTS

| 5,027,402 A * | 6/1991 | Richards, Jr. ........ H04B 1/1676 381/10 |
| 7,292,694 B2 * | 11/2007 | Wildhagen ........... H04B 1/1676 381/11 |
| 2002/0054683 A1 | 5/2002 | Wildhagen |
| 2009/0203344 A1 | 8/2009 | Hanawalt et al. |
| 2014/0355764 A1 | 12/2014 | Elenes |

FOREIGN PATENT DOCUMENTS

| DE | 102011016338 A1 | 1/2012 |
| WO | 2007109338 A1 | 9/2007 |

OTHER PUBLICATIONS

"Decision to Grant" issued in co-pending German patent application No. 102016107799.2, dated Feb. 1, 2017, Published in: DE.
"Office Action" issued in co-pending German patent application No. 102016107799.2, dated Dec. 13, 2016, Published in: DE.
Officer Jacques Reichert, "International Search Report and the Written Opinion", PCT/EP2017/059860, Completed Aug. 2, 2017, 15 pp. (Partial translation of the Written Opinion included).

\* cited by examiner

*Primary Examiner* — Melur Ramakrishnaiah
(74) *Attorney, Agent, or Firm* — Kaplan Breyer Schwarz, LLP

(57) ABSTRACT

A method for processing an FM stereo signal. The FM stereo signal is digitized and divided into overlapping blocks, which are transformed into the frequency domain. Individual spectral lines of the difference signal are lowered if these have a higher magnitude than the respective spectral lines of the sum signal. The sum and difference signals are then transformed back.

13 Claims, 20 Drawing Sheets

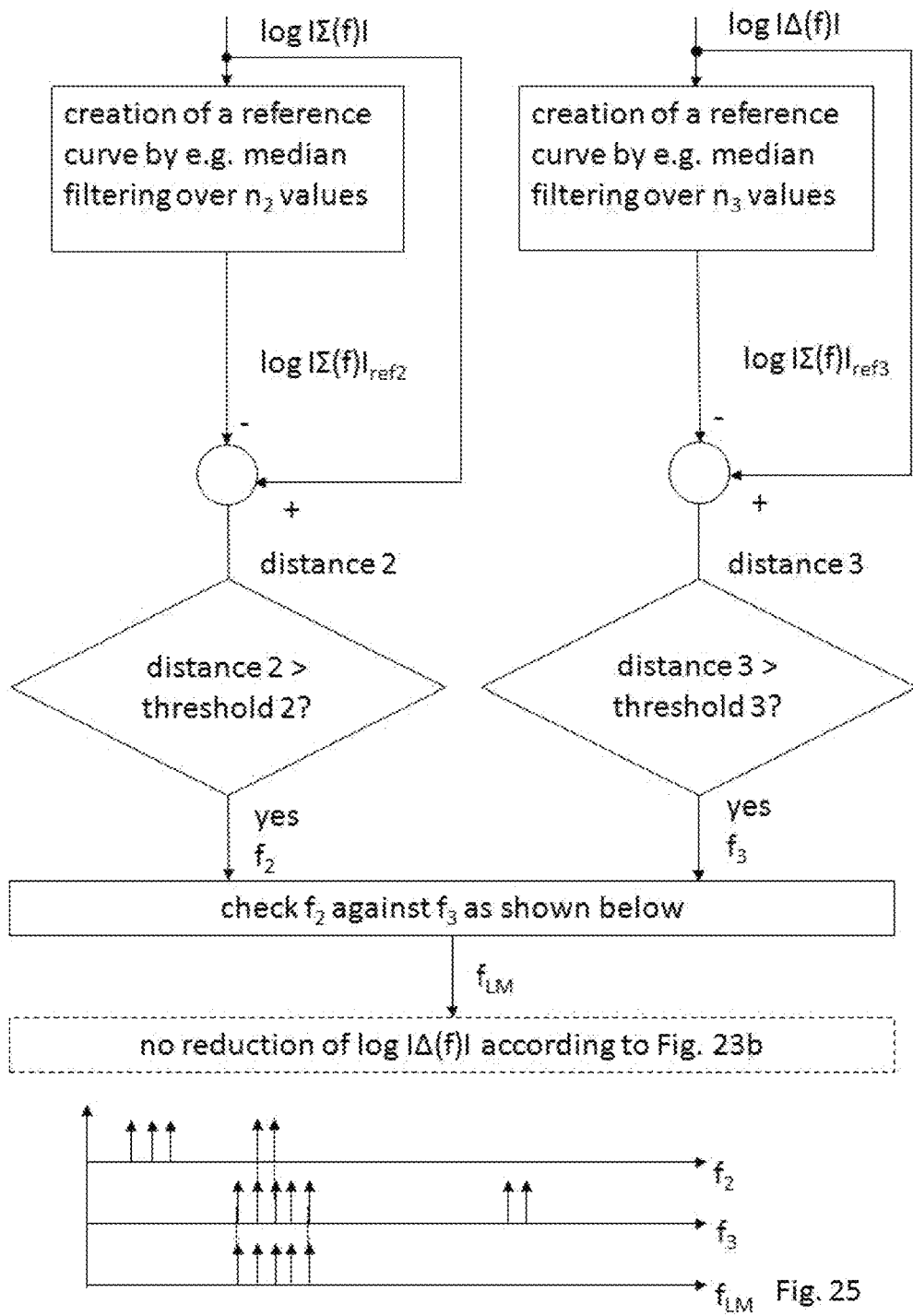

_METHOD FOR PROCESSING AN FM STEREO SIGNAL_

FIELD OF THE INVENTION

The invention relates to a method for processing an analog FM stereo signal subjected to digital signal processing.

BACKGROUND OF THE INVENTION

The pilot-tone system described in ITU-R BS.450 is used to transmit stereo signals from the FM transmitter. This system applies a preemphasis (high frequency boost) to the left (L) and right (R) audio channels, before using a matrix which generates a sum signal (L+R)/2 and a difference signal (L−R)/2.

The sum signal is transmitted in base band up to 15 kHz. The difference signal is transmitted in double sideband modulation, with the 38 kHz carrier suppressed. To enable the receiver to demodulate the difference signal, a pilot tone is transmitted with a frequency of 19 kHz, which corresponds to half the carrier frequency.

The signal mixture of sum-, difference, and pilot-tone signal is referred to as a multiplex signal (MPX). The MPX signal and additional signals, if necessary (such as RDS) modulate an FM transmitter's high-frequency carrier signal in its frequency. The high-frequency broadcasting is done via an antenna.

A superheterodyne FM receiver receives the high-frequency signal via an antenna. The radio-frequency signal (RF signal) of the antenna is amplified, preselected in the frequency, and moved into an intermediate frequency (IF) range.

An intermediate frequency filter lets through most of the usable signal bandwidth and filters out most adjacent channel interference. By subsequent amplitude limiting of the intermediate frequency signal in a limiter, the amplitude fluctuations in the RF- and/or IF-signal reception are suppressed.

Subsequently, a frequency demodulation takes place that delivers the MPX signal. This is fed into a stereo decoder.

A block diagram of an MPX stereo decoder is shown in FIG. 1.

A mono receiver evaluates only the sum signal (L+R)/2 in the baseband extending up to 15 kHz. In a stereo receiver, a stereo decoder obtains the L and R signals from the MPX signal.

In the stereo decoder, a frequency doubling of the pilot tone signal takes place, and hence a recovery of the carrier frequency 38 kHz of the difference signal occurs. The stereo decoder demodulates the double sideband-modulated difference signal and thus recovers the signal (L−R)/2. The sum signal (L+R)/2 is recovered directly from the baseband. By dematrixing, meaning addition or subtraction of these two signals, the decoder recovers the preemphasized L and R signals again. These are then subjected to a deemphasis that compensates for the transmitter-side preemphasis. The original signals L and R are thus available.

Other decoding methods, such as the switching-decoder, differ from the above-depicted signal processing with regard to demodulation and dematrixing; however, they can be converted in the above model as seen in signal theory.

The receiver behavior according to current technology is as follows.

The FM pilot tone system should first be considered in theory with respect to noise.

The constant noise density in the RF- or IF-range is converted by the FM-demodulation process into a frequency-proportional voltage-density.

The MPX-spectrum and noise voltage density (Rauschspannungsdichte) are shown in FIG. 2.

It can be seen from FIG. 2 that the difference signal contains significantly more noise between 23 and 53 kHz than the sum signal, which only reaches up to 15 kHz.

The monaural audio signal-to-noise ratio $SNR_{FM}$, prevailing after the FM demodulation with respect to +/−75 kHz frequency deviation without consideration of a pre/deemphasis, can be approximated by the following formula:

$$SNR_{FM}=3\beta^2((\beta+1)CNR \text{ with the radio-frequent carrier-to-noise-ratio}$$

$$CNR=A^2/(2B_T N_0)$$

$\beta$ is the FM modulation index
A is the amplitude of the carrier signal
$N_0/2$ is the two-sided spectral noise power density with white noise
$B_T$ is the radio frequency transmission bandwidth
It can be estimated using the Carson formula by way of $$B_T=2((\beta+1)W$$

W is the audio signal bandwidth
The result obtained with the Carson formula is $\beta+1=B_T/2$ W
Used in the formula for $SNR_{FM}$ results for $\beta\gg1$ in $$SNR_{FM}=3CNR(B_T/2W)^3$$

The above-mentioned formulas apply above the so-called FM threshold, below which the signal quality decreases rapidly and impulse-noise can be expected, which results in clicks or crackling after demodulation.

The FM threshold at a radio frequency transmission bandwidth of 180 kHz is approximately 11 dB CNR. Above this threshold is:

$$SNR_{FM}=28 \text{ dB}+CNR \text{ with mono reception}$$

$$SNR_{FM}=5 \text{ dB}+CNR \text{ with stereo reception}$$

10 dB can further be added when considering a preemphasis/deemphasis of 50 µs respectively 13 dB at 75 µs.

The FM threshold of approximately 11 dB corresponds to a mono audio-to-noise ratio of 39 dB+deemphasis-gain. In case of a deemphasis of 50 µs there is likely to be at least a 49 dB mono audio signal-to-noise ratio, or 26 dB stereo audio signal-to-noise ratio. With regard to a 40 kHz frequency deviation, an audio signal-to-noise ratio of 43.5 dB mono and 20.5 dB stereo is to be expected. The mono-gain in the audio signal-to-noise ratio at the FM threshold is 23 dB. In the receiver, the mono-gain [N(mono)−N(stereo)] decreases with increasing audio signal-to-noise ratio, as can be seen from the limiter curve of an exemplary FM receiver shown in FIG. 3.

The audio signal-to-noise ratio SNR is limited upwards by the inherent noise of the rest of the transmission chain. In FIG. 3 the solid curve N (stereo) shows the size of the noise N of an FM stereo reception. The dashed line N shows the function "stereo blend" which reduces the level of the difference signal according to a falling of the antenna input voltage below a threshold (here about 100 µV antenna voltage). The noise power N is kept at a reduced level and does not rise further. The result is an increasing deterioration of the L-R channel separation (stereo blend) up to mono (L=R, i.e., no channel separation).

From approximately 40 µV, the useful signal reaches its full level. The distance from the curve N to the curve S+N is the audio signal-to-noise ratio.

According to current technology, a reduction of the level of the difference signal is used to raise the audio signal-to-noise ratio at the expense of the L-R channel separation. The reduction can be made broadband or in frequency ranges, such as in the high frequencies, and depends on the extent of external signals, external criteria, or an estimate of the interference signal.

Further actions in the receiver to reduce the audibility of interferences in the audio frequency range or MPX range are lowering of the higher audio frequencies (hi-blend, hi-cut) during strong noise, and volume-reduction or muting (muting, noise blanker) during strong interference. These also have an effect on the sum signal (mono signal).

Object of the Invention

Given this background, it is an object of the invention to improve the audible stereo audio signal-to-noise ratio without limiting the L-R-channel separation further. The improved signal-to-noise ratio should be, in particular, the mono-quality.

Furthermore, the invention relates to the steps of improvement from the signal itself without the help of external signals or external criteria (such as the antenna voltage).

SUMMARY OF THE INVENTION

The object of the invention is already achieved by a method for processing an FM stereo signal according to one of the independent claims.

Preferred embodiments and further refinements of the invention are subject matter of the dependend claims, the descriptions as well as the drawings.

The invention relates to a method for processing an analog FM stereo signal. The invention therefore relates to the processing of analog radio signals broadcasted in stereo sound.

The analog stereo signal can be used in the manner described in the introduction as a sum and difference signal as well as a signal in which the left and right channels are separated from each other.

The method according to the invention for processing an FM stereo signal can also be characterized in that an FM stereo signal is digitized, the digitized signal is subjected to a signal processing, and is then transformed back into the analog signal.

According to the invention, the signal processing is performed digitally, i.e. the processing of the signal is performed by means of a microprocessor in digital form.

For this purpose, the analog FM stereo signal, as sum and difference signal, is digitized. This digitized signal is divided into overlapping blocks.

The block length is preferably greater than the time shift between the sum and the difference signal.

In particular, the block length can be between 10 and 1000 ms, preferably between 50 and 150 ms. A large block length leads to a high frequency resolution, but allows for a rather reduced noise reduction because the useful signal spectrum approximates the interference signal spectrum.

The overlapping blocks allow a consecutive transformation into the frequency domain, and there, a signal processing. After conversion, the signal is available as a difference and sum channel spectrum, in which the signal, blockwise, is divided into a plurality of spectral lines representing the magnitude and the phase of the signal at the respective frequency.

Thus, a first aspect of the invention relates to a digital signal processing, in which the analog signal is digitized and at least partially processed in the frequency domain. For this purpose, the spectral lines of the differential signal spectrum are compared with the corresponding spectral lines of the sum signal spectrum. It is understood that under "signal spectrum" in each case the signal magnitude spectrum is understood, and thus the comparison refers to the respective amounts. For further explanations, these are considered to be logarithmic.

According to the invention spectral lines of the difference signal, spectrum are attenuated if they have a higher amount than the respective spectral lines of the sum signal spectrum.

Preferably, the lowering is made to the amount of the sum signal spectrum. However, it can remain a difference to the amount of the sum signal spectrum, in particular a difference of a maximum of +/−6 dB, preferably +/−3 dB.

This aspect of the invention is based on the assumption that the stereo signal comprises only signal components that can be localized within the stereobase.

It follows that a spectral line of the difference signal spectrum cannot have a higher magnitude than the corresponding spectral line of the sum signal spectrum. The conclusion applies to intensity stereophony (simultaneous sum and difference signal). It applies to time-based stereophony if the time difference between the two signals or their portions do not lead to altered magnitude spectra. The latter is true if the block length clearly exceeds the time difference.

By transforming into the frequency domain, a processing of the signal components in digitized form is possible in a simple way. In particular, this can be done purely via software, for example, on a smartphone or consumer electronics device. Preferably, the entire signal processing is done purely via software, also including the processing in the time domain.

After this digital signal processing, the sum and difference signal is transformed back and the overlapping blocks are added.

The signal can now be dematrixed and converted into an analog signal for the drive of a loudspeaker.

According to the further rules, that are also described in concrete terms, in particular, interference-induced drops of the sum signal as well as interference-related increases of the spectra can be recognized and exceptions can be defined not to falsify the (undisturbed) signal and to reduce interference if necessary.

In a further embodiment of the invention, the frequency corresponding spectral lines of the difference signal spectrum are not attenuated at all or are less attenuated, if the width of a relative minimum of the sum signal spectrum is below a threshold and the depth is above a threshold, thus creating a cancellation.

This approach to the reduction of the difference signal is based on the consideration of time differences of the signals, which lead to interferences.

Interference leads to level drops (cancellations) and/or level increases at specific points of the frequency spectrum.

However, such drops have a narrow bandwidth. If the interference-related drops were used to cause an attenuation of the difference signal at these points, the FM stereo signal would be distorted.

In a further embodiment of the invention, in the range of a local maximum of the difference signal spectrum, the latter is compared with the sum signal spectrum, and the difference signal spectrum is not attenuated in this range or is less attenuated, if a maximum of the sum signal spectrum lies within the frequency bandwidth of the maximum of the difference signal spectrum.

This further embodiment of the invention relates to the treatment of local maxima, which can, as well as local minima, be caused by time delay phenomena.

The further embodiment of the invention according to claims 2 and 3 therefore provides an exception to the rule defined in claim 1.

Cancellations and local maxima of a frequency spectrum can be identified as such by their frequency bandwidth and their distance to the spectral substitute value.

A median filtering of the spectrum produces a reference curve. If the distance of the spectrum to the reference curve exceeds a threshold value, a cancellation or a local maximum is identified. Their frequency bandwidth corresponds to the number of consecutive spectral lines which exceed the threshold value.

The median value is calculated from the spectral values of the spectrum within a window around a frequency. It serves here as a substitute value in the spectrum and bridges outliers of the spectrum level.

For cancellations, local maxima of the sum spectrum and local maxima of the difference signal spectrum, distinct threshold values are provided in dB, which a distance must exceed in order to confirm an identification.

If, therefore, such a cancellation is confirmed, the lowering of the corresponding spectral lines of the difference signal spectrum is not made according to the previously defined rule. That is, an exception is made to the previously defined rule.

A further embodiment of the invention provides that time differences between the sum and difference signals are determined via a similarity analysis or a correlation of the signals in the time domain.

Specifically, by cross-correlation and/or consideration of the cancellation in the frequency domain, in particular by comparing the respective frequencies and the respective bandwidths of the cancellations in the sum and difference signal spectra, the presence of time-based stereophonic portions in the signals can be determined. This is true if cancellations occur in the sum and difference signals at different frequencies.

In a further embodiment of the invention, in a block-wise similarity analysis, the analysis result of the previous block is taken over if the currently processed block shows a signal-to-noise ratio (SNR) lying below a threshold value. For example, if the signal-to-noise ratio falls below a threshold value in a block, the IS/LS analysis becomes unreliable. Therefore, according to this embodiment, the decision of the last block with a high signal-to-noise ratio is adopted.

If the calculation yields the presence of time-based stereo signal portions, again according to this embodiment of the invention, the rule defined in claim 2 and/or 3 takes effect. This ensures that the exemption rule according to claim 2 and/or 3 is only used with time-based stereophony.

The further developments of the invention, as defined in claims 2 to 4, serve to avoid sound distortions, in particular to prevent a fault-free signal from being corrupted in an audible manner.

In a further embodiment of the invention, in the case of a cancellation of a spectral line in the sum signal spectrum, the spectral line of the difference signal is only reduced to a spectral substitute value, in particular to a median value of the sum signal spectrum.

This is a differentiation of the cancellation rule.

If the magnitude of the difference signal spectrum at a frequency is greater than the corresponding value of the sum signal spectrum, the difference signal spectrum is lowered in case of a cancellation to the median of the sum signal spectrum determined for this frequency.

The reduction to the spectral substitute value of the sum signal spectrum reduces interference-induced increases in the difference signal spectrum and avoids a sound distortion by an otherwise greater reduction of the spectral line.

In a further embodiment of the invention, the difference signal in the time domain is limited to the envelope curve of the sum signal whose maxima are held (peak hold) for a period of time before and after the entry time of the maximum. The so-changed envelope curve or the sum signal is multiplied by a factor of greater than 1, in particular a factor between 1 and 2.

This aspect of the invention is based on the assumption that the stereo signal does not map spots outside the stereo base. It follows that the difference signal cannot have a higher magnitude than the sum signal multiplied by a factor which takes into account a statistical signal increase which can occur with certain signal constellations of the sum and difference signals.

Preferably, the restriction of the difference signal in the time domain to the envelope curve of the sum signal is only performed when a transient character of the signal is detected via an evaluation of the signal or the envelope curve of the sum signal.

This is preferably done before the attenuation of individual spectral lines of the difference signal, that is to say, before processing in the frequency domain.

The envelope curve can be multiplied by a factor, in particular an empirical factor between 1.1 and 2.0, preferably between 1.3 and 1.6.

The invention further relates to a computer program which includes a plurality of instructions which can be stored on a computer, in particular on a smartphone or consumer electronic device. The instructions, when processed by a microprocessor or microcontroller, perform a method as described above.

The invention relates in particular to a purely software-based processing of an analog FM stereo signal in a device such as, for example, a smartphone, but also in a radio with digital signal processing, in particular a car radio.

It is clear that, in the case of known devices in which digital signal processing is already present, all necessary further process steps, if appropriate, can be integrated into this digital processing.

In particular, in the case of smartphones and consumer electronics devices which comprise a microprocessor, the hardware components required for carrying out the method according to the invention are present when the device is provided with a tuner for receiving analog FM stereo signals.

The method according to the invention can be implemented, in particular, purely through software, via a program (app). The instructions for carrying out the method according to the invention are stored on a data store.

In a further embodiment of the invention, the signal processing takes place in an application-specific integrated circuit (ASIC), which carries out the signal processing according to the method according to the invention.

BRIEF DESCRIPTION OF THE DRAWINGS

FIG. 25 shows the identification and the comparison of the maxima depicted in FIG. 23b.

DETAILED DESCRIPTION

Figure 1:
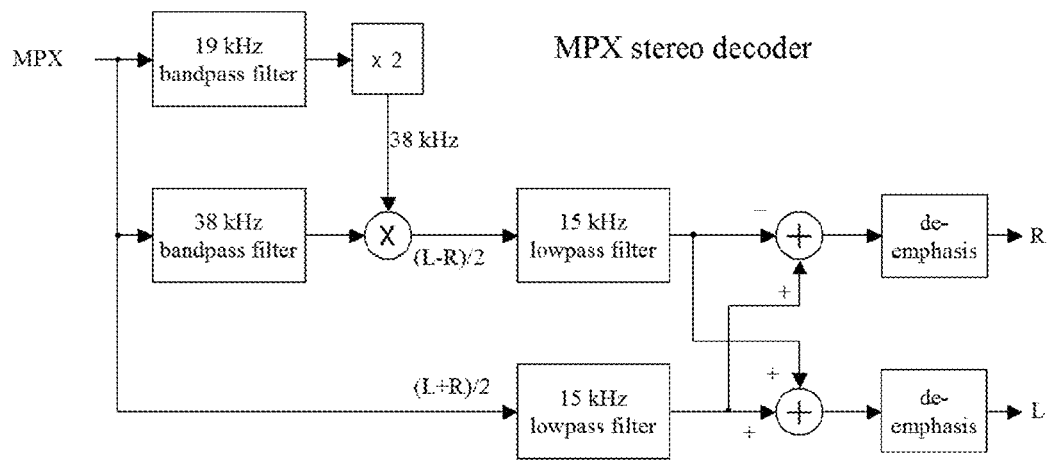
FIG. 1 shows a block diagram of a MPX stereo decoder.
Figure 2:
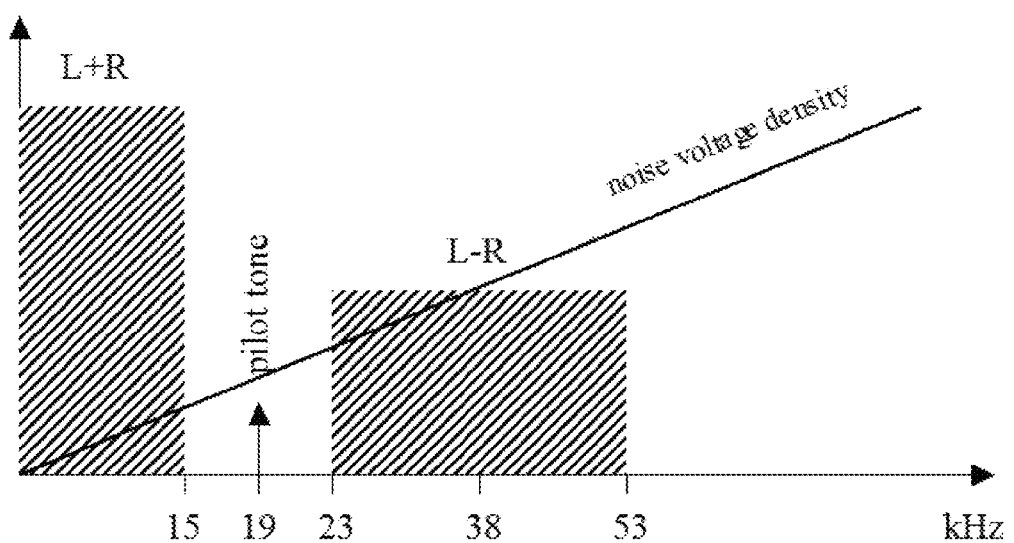
FIG. 2 shows a MPX-spectrum and noise voltage density.
Figure 3:
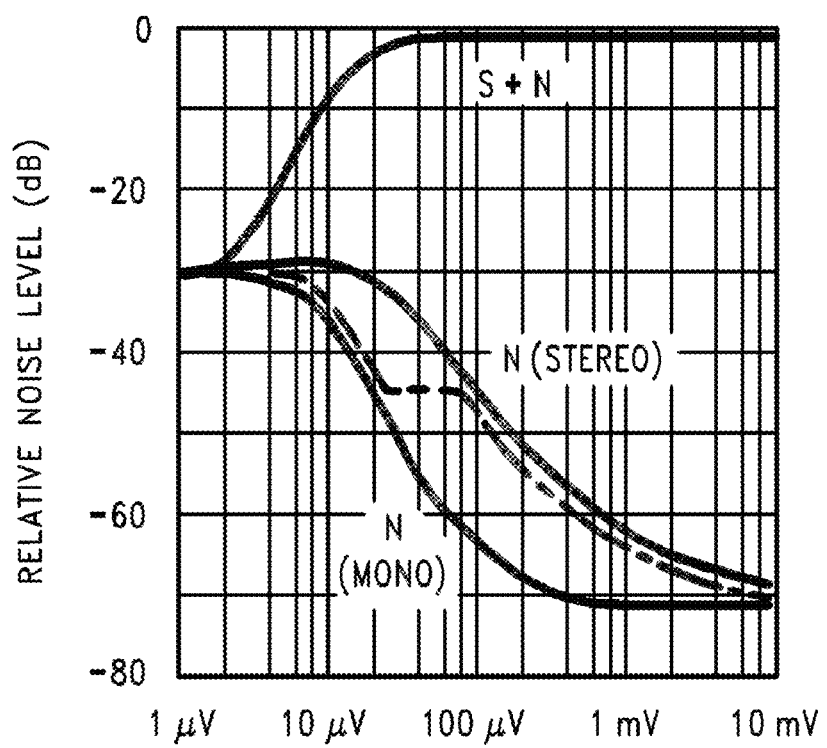
FIG. 3 shows a limiter curve of an exemplary FM receiver in which the mono-gain [N(mono)–N(stereo)] decreases with increasing audio signal-to-noise ratio.

The method according to the invention will be explained in detail below with reference to an exemplary embodiment and with reference to the further drawings.

1. Overview of the Method

In which form (time domain or frequency domain) and to which extent the difference signal may differ from the sum signal without restricting the stereo base, is theoretically derived in the following manner. The resulting rules for signal processing allow the disturbed difference signal to be approached audibly to the undisturbed difference signal without explicit knowledge of the interfering signal or without external information. The interfering signal does not need to be estimated.

The rules are obtained exclusively from the signals L and R or (L+R), and (L−R). Therefore, it is also possible to process recorded stereo signals of an FM stereo receiver after the fact.

The signal processing of the difference signal according to the derived rules will result in an approximation of the undisturbed difference signal.

Thereby the achieved noise reduction is not dependent on a signal threshold. It works in all signal level ranges.

The method yields the effect of individual frequency portions within the critical bandwidth to the hearing as well as the masking effect.

The modular structure of this method allows for different quality levels dependent on the varying realization efforts of signal processing to be implemented.

The method according to the invention for the signal processing of an FM stereo signal processes audio signals of the left and right channel after a stereo decoding in the receiver in digitized form. The sum signal and difference signal can alternatively be processed.

It is assumed that functions such as stereo blend and hi-blend are turned off, and the muting level and the volume reduction in the case of severe disturbances is adapted to the method, to fully exploit the benefits of the method.

The method adapts the signal processing to the signal characteristics.

To this end, various signal analyses are carried out. The aim will be for the undisturbed signals to remain practically audibly unchanged, while the disturbed signals will be freed very effectively of interference while preserving the L-R channel separation.

2. Block Structure and Overlap-Add

Signal processing takes place in blocks, which means the audio data of both channels is collected for a period of time and then processed. Signal processing is non-linear and takes place in the time and frequency domain. In the following, the term "frequency domain" stands for the domain of the transformed signal. The transformation may be a Fourier transform or a wavelet transformation or the like.

The signal processing steps for noise reduction are embedded in a weighted-overlap-add structure (WOLA). It's possible to perform a consecutive transformation into the frequency domain by WOLA. The WOLA structure used consists of the following parts:

Creation of an overlapping block structure.
Multiplication of the block with an analysis window function (here, root-Hanning). This facilitates the use of a transformation into the frequency domain without so-called spectral leakage.
Zero-padding the block with sample values to the desired block length for the transformation into the frequency domain.
Transformation into the frequency domain, non-linear processing, back-transformation into the time domain
Multiplying the block with a synthesis-window function (here, root-Hanning) to reduce artifacts caused by the non-linear processing. The synthesis-window function hides this error at block boundaries and avoids audible discontinuities.

Addition of overlapping blocks (overlap-add)

The WOLA is signal-transparent within itself, i.e., as long as no changes to the signal are made, the output signal corresponds to the input signal. The synthesis-window function and the block overlap reduce unwanted signal changes, especially at block boundaries.

A detailed description can be found under point 9: Signal Processing.

3. Intensity Stereophony (IS)

In the case of pure intensity stereophony, a musical instrument or a voice within the stereo base is mapped to a virtual spot by splitting the signal at a certain ratio to the left (L) and right (R) channel. The place is defined by the relative levels of the left channel (L) and right channel (R). The signals in L and R are equal to each other in time/phase.

During reproduction, human hearing can determine the auditory event direction, and thus the origin of the sound source within the stereo base, by means of level differences between the left and right ear.

Figure 4:
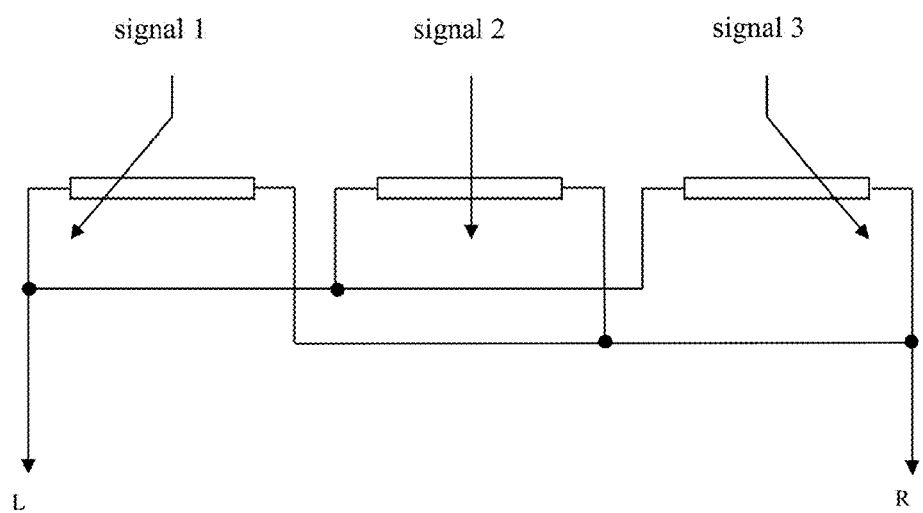
FIG. 4 shows a diagram of a signal division into the channels L and R in the case of pure IS.

FIG. 4 shows the diagram of a signal division into the channels L and R in the case of pure IS.

The stereo base extends from the far left (R=0) to the center (L=R) up to the far right (L=0).

For FM stereo broadcasting, the audio signals L(t) and R(t) are matrixed.

A sum-signal σ(t) and a difference signal δ(t) is created. For L, R, σ and δ for the sake of simplicity, the time dependence is henceforth assumed and is omitted in the remaining representation.

The matrixing specification is as follows:

$$\sigma=(L+R)/2 \text{ and } \delta=(L-R)/2$$

A de-matrixing takes place on the receiving side:

$$L=\sigma+\delta \text{ and } R=\sigma-\delta$$

First a single sine wave signal should be considered.

If we assume that on the transmitting end there is no excess width of the stereo base, in other words R=0 and L=0 represent the extreme locations of the stereo base, then results for $$R=0: \delta=\sigma$$

and for $L=0: \delta=-\sigma$ deriving: $|\delta|=|\sigma|$

For each spot mapped within the stereo base, regarding the sine wave signal follows $$|\delta| \leq |\sigma| \quad \text{Rule 1}$$

where the equality holds true for the cases R=0 and L=0.

The absolute value function |σ| can be regarded as an envelope, which is supported by relative maxima/minima of the sum signal.

Figure 5:
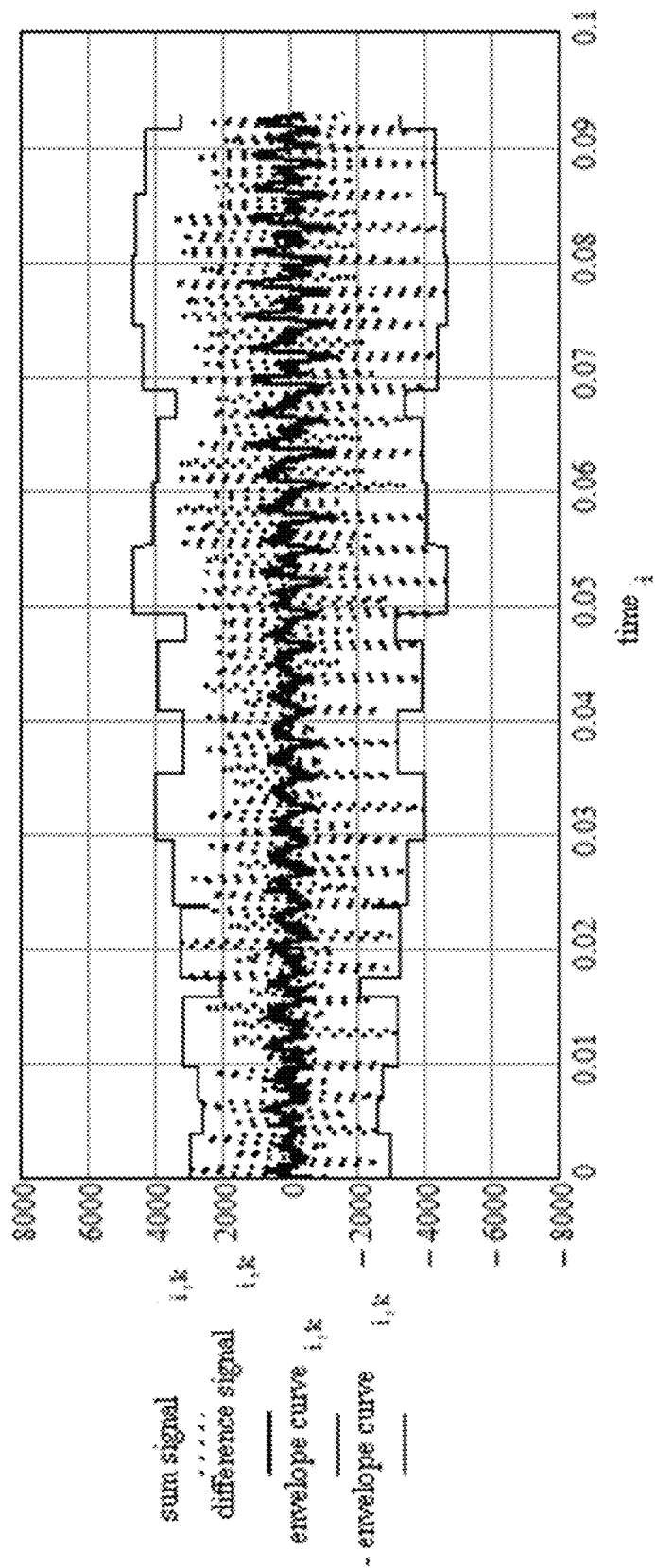
FIG. 5 shows the sum and difference signals as well as the resulting envelope curve of the sum signal.

FIG. 5 shows exemplary sum and difference signals as well as the resulting envelope curve (of a complex signal and not of a simple sinusoidal signal).

Rule 1 can be defined in the time and in the frequency domain of the audio signals:

a. Time domain: At any given time, the absolute value of the difference signal is smaller than that of the sum signal, or is at most equal to it. The difference signal lies within the envelope of the sum signal.

b. Frequency domain: At each frequency, the power of the difference signal is smaller than the power of the sum signal, or is at most equal to it.

Rule 1 leads to the following signal processing according to the invention:

If the difference signal is superimposed with noise and the above-mentioned rule is violated in the time domain or frequency domain, then the difference signal can be reduced in its absolute value to that of the sum signal at the appropriate time resp. at the corresponding frequency.

The frequency spectrum with infinitesimal resolution is defined as the sum of spectral lines. Each spectral line can be interpreted as a vector with an amplitude value (magnitude) and an associated phase value. A disturbance can increase or decrease the amplitude value, change the phase value, and leads to a corrupted channel separation via the dematrixing.

The amplitude value is then reduced according to Rule 1b to the value of the sum signal spectrum (corresponds to the case R=0 and L=0, respectively). Because of the infinitesimally small bandwidth, it is irrelevant whether the power originates from the useful or interference signal or both. The phase value is processed unchanged.

Figure 6:
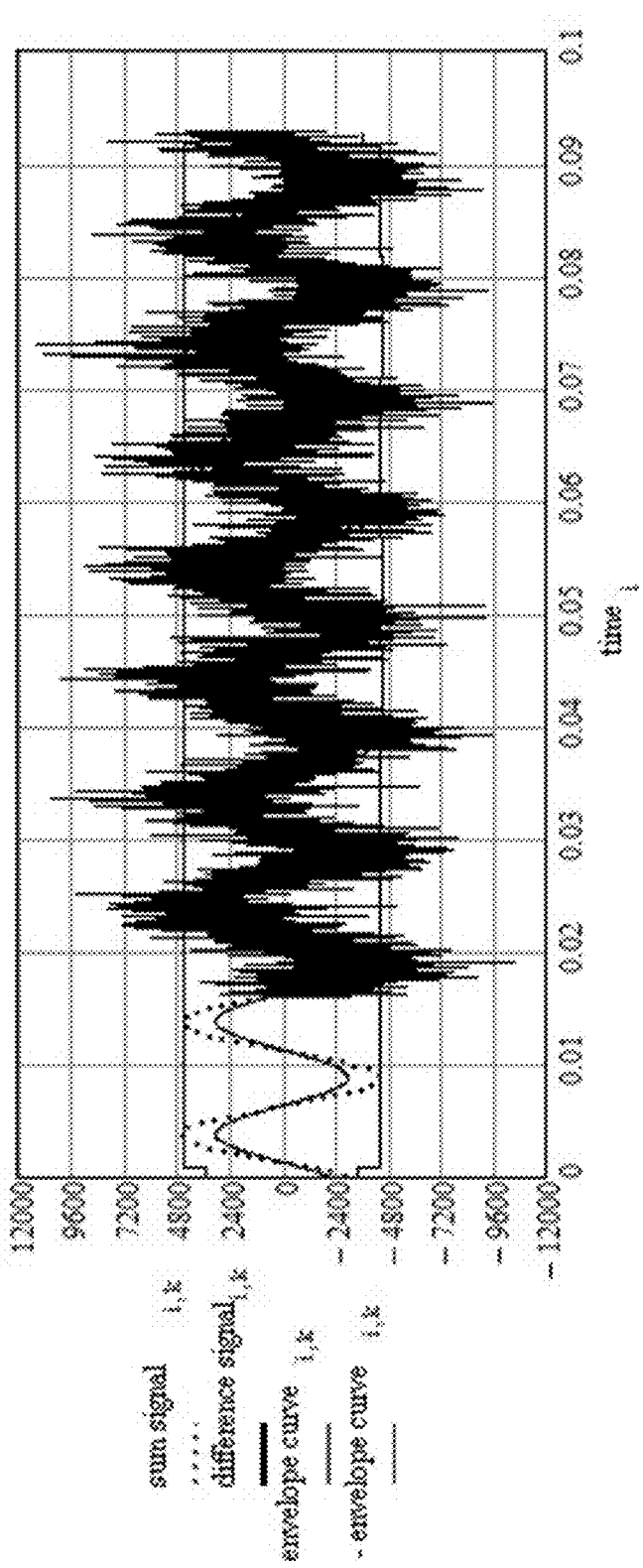
FIG. 6 shows the sum signal and the difference signal, with the difference signal being partly outside the envelope curve, and a reduction of the disturbance in the time domain being possible.
Figure 7:
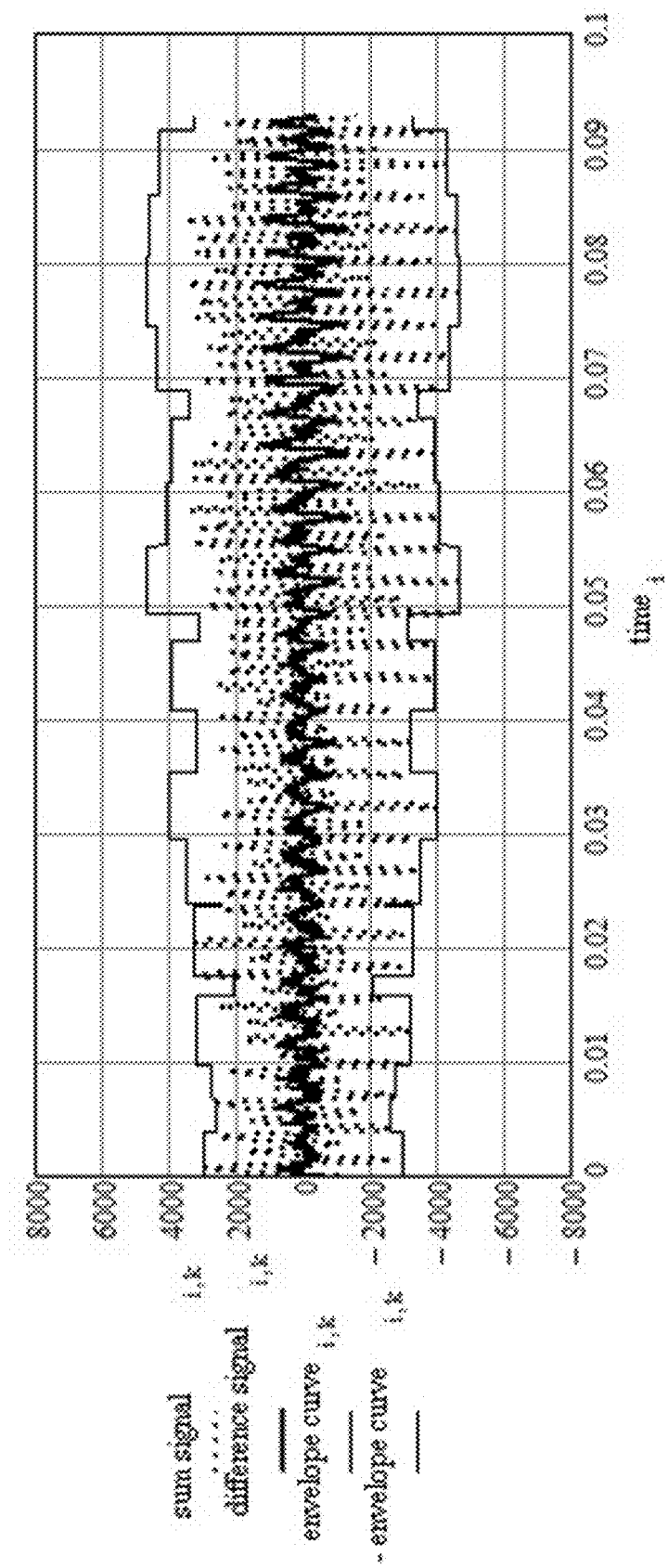
FIG. 7 shows a reduction of the disturbance in the time domain is not possible.
Figure 8:
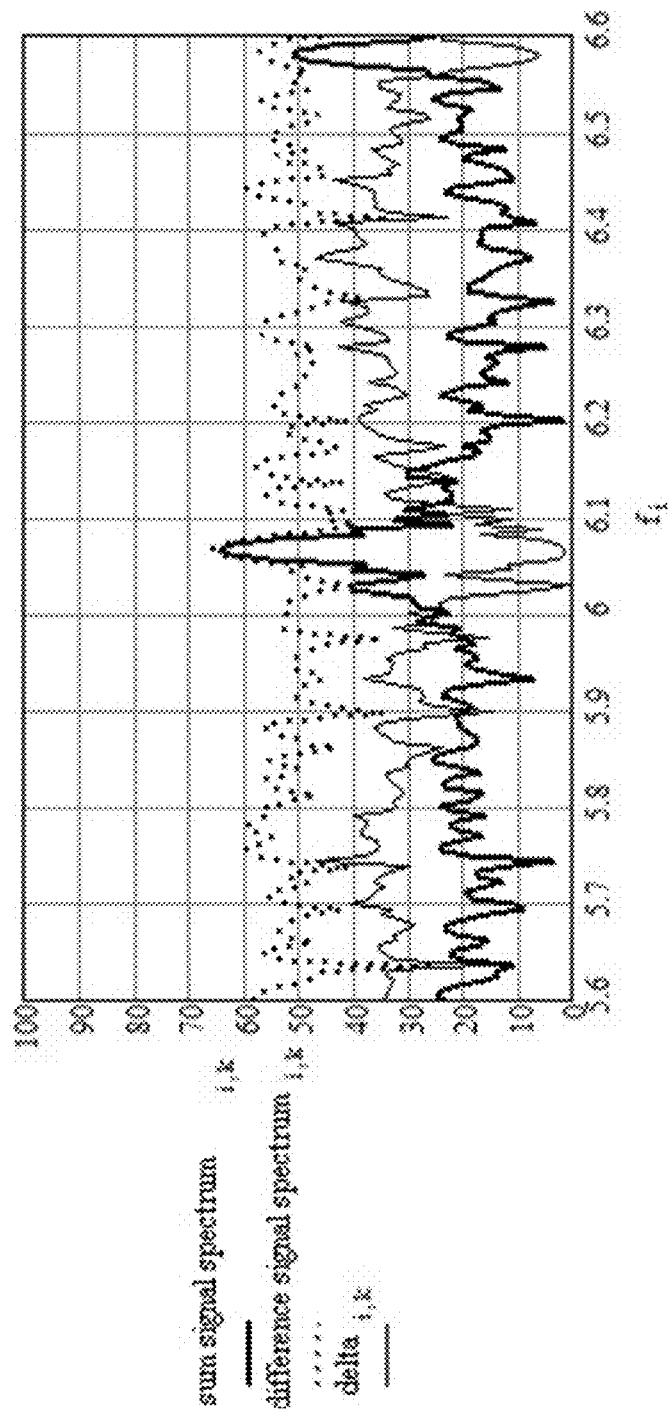
FIG. 8 shows that, in the frequency domain, a reduction of the disturbance is possible.

The signal processing is to be illustrated in three examples according to FIG. 6 through FIG. 8:

As shown in FIG. 6, the sum signal is superimposed by the difference signal such that the sum signal cannot be seen in the manner shown in sections. The difference signal is partly outside the envelope curve. A cut-off of the interference signal components, and thus a reduction of the disturbance in the time domain, is therefore possible.

According to the illustration in FIG. 7, however, a reduction of the disturbance in the time domain is not possible. Since the disturbed difference signal is still within the envelope curve of the sum signal, no level reduction can occur in the time domain.

In the frequency domain, a reduction of the disturbance is possible, as shown in FIG. 8. The power of a frequency f in the disturbed difference signal can be reduced to the power of the corresponding frequency in the sum signal. The extent of the reduction is indicated here as delta.

The application of rule 1 in the frequency domain represents the largest share of noise reduction.

Often, many spectral lines of the difference signal are lower than those of the sum signal, e.g., in the case of an undisturbed signal in which the stereo effect is not extremely pronounced (e.g., R=L/2).

A reduction of amplitude values of the difference signal spectrum is only carried out if the disturbance raises the amplitude value above the value of the sum signal spectrum. This can occur particularly in the case of quiet passages, in which the disturbance dominates the useful signal.

With increasing frequency resolution (corresponding to increasing block length), more details of the spectra are opened, also in the form of gaps and sinks of the sum signal spectrum. The method exploits this situation and, in particular, lowers interfering signals in the difference signal spectrum at these points.

It is relevant to human hearing how well this interference suppression works within the frequency groups. In a frequency group or critical bandwidth, the human hearing evaluates the frequencies or spectral lines in common. There are 24 frequency groups from 0 to 20000 Hz.

Figure 9:
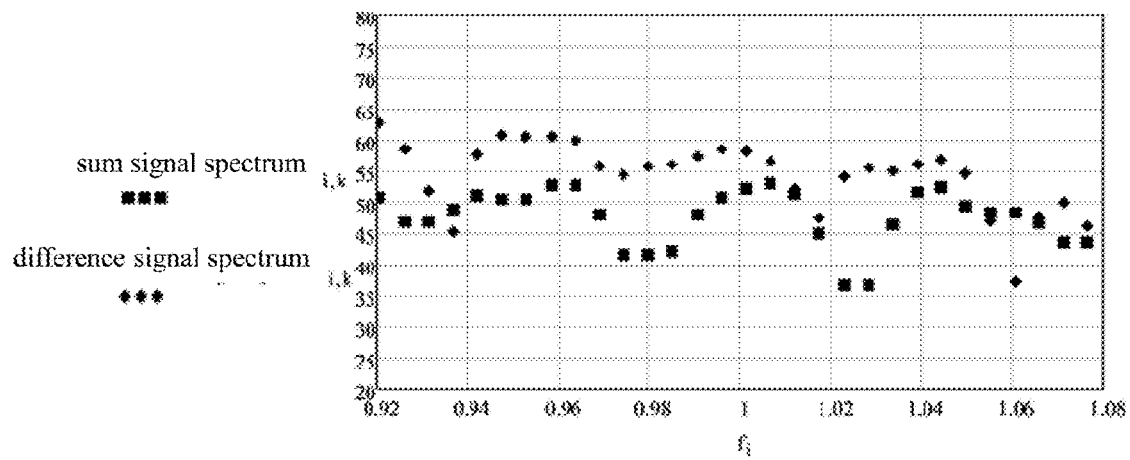
FIG. 9 shows a critical band No. 9 from 920 Hz to 1080 Hz with 30 spectral lines, three of which are not lowered.

FIG. 9 shows the critical band No. 9 from 920 Hz to 1080 Hz with 30 spectral lines, three of which are not lowered.

The above mentioned noise reduction at high frequency resolution causes an increase in the SNR within the frequency groups formed in the hearing.

The sum signal spectrum and the interference-reduced difference signal spectrum are mapped by the dematrixing into the channels L and R. In the frequency range there is a masking of possible residual errors of the interference suppression process. The masking depends on the statistical properties and the spectral distribution of the useful signals in the left and right channels.

Figure 10:
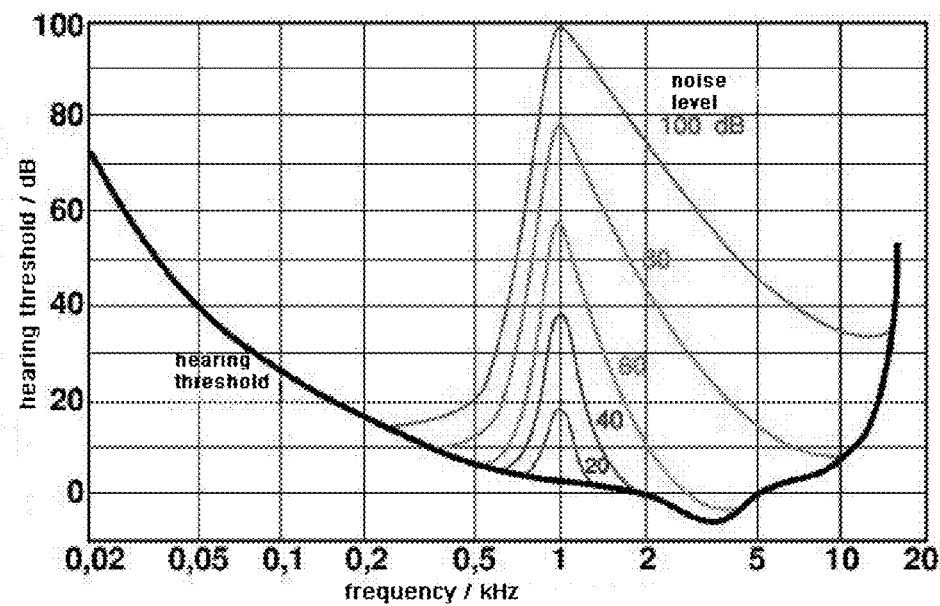
FIG. 10 shows the masking curves of a 1 kHz sinusoidal for different levels.

FIG. 10 shows the masking curves of a 1 kHz sinusoidal for different levels. If the 1 kHz tone has a level of 100 dB, for example, a 2 kHz tone with 70 dB cannot be perceived in the same channel.

It is understood that such masking effects in the frequency range also play a role for the perception of the processed signal, in particular with regard to residual errors, even if these masking effects do not enter the processing of the signal.

The frequency groups are arranged in an approximately logarithmic frequency scale. For the purposes of the invention, for example a logarithmic scaling is also conceivable in the transformation into the frequency domain. In the exemplary embodiment shown here, however, a linear scaling is performed.

According to the method of the invention, preferably no spectral lines of the audio signal are combined into frequency groups. Rather, the evaluation of frequency groups is left to the human hearing, whereby the above-mentioned masking effects enter the perception of human hearing.

If we consider a composite signal instead of a single signal
then the situation is somewhat different.

Figure 11A:
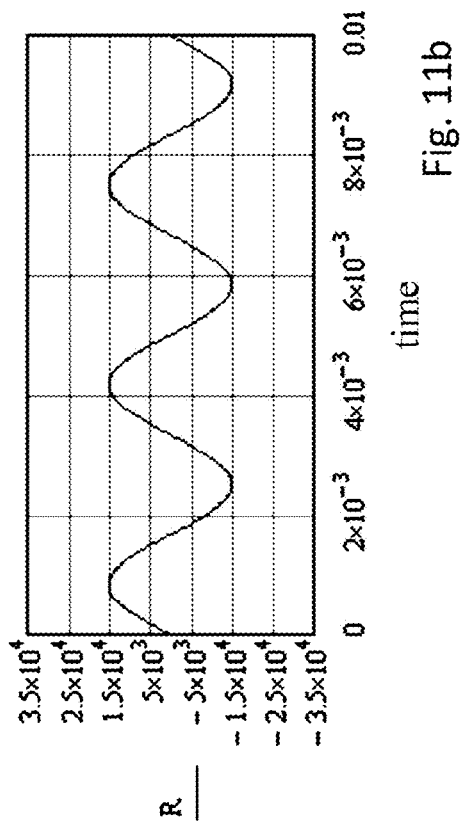
FIGS. 11a and 11b show an example in which L=sine signal 900 Hz and R=sine signal 300 Hz.
Figure 11B:
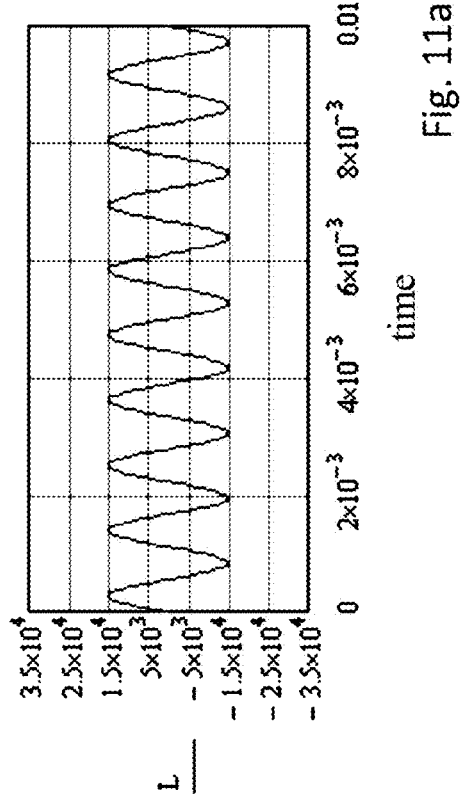

FIGS. 11a and 11b show an example:
L=sine signal 900 Hz, R=sine signal 300 Hz

Figure 12:
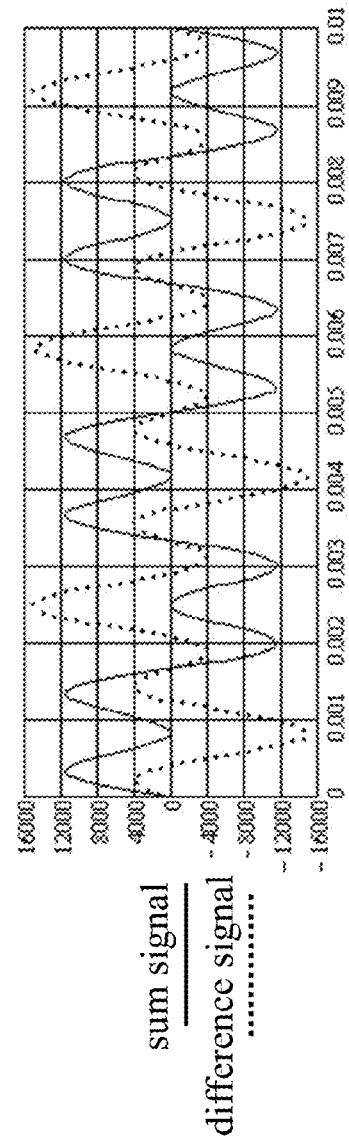
FIG. 12 shows the sum signal and the difference signal associated with FIGS. 11a and 11b.

FIG. 12 shows the sum signal and the difference signal (dotted)

Based on this example it can be seen that the difference signal can have a higher amplitude than the sum signal. Most cases are detected in more complex signal constellations with a factor of 1.4. It is also apparent that the maximum of the sum and difference signal does not necessarily have to be concurrent. The envelope curve of the sum signal must be expanded by the factor $k_{IS}$, and relative maxima/minima of the sum signal must be held for a certain time so that the maxima/minima of the difference signal can be included. Since a maximum can occur first in each of the two signals, the hold time should also apply to periods prior to the observation time.

The time difference between the extreme values of the sum signal and difference signal corresponds to a half period of the higher frequency signal if the frequency ratio is 3:1. A time difference of +/−3 ms corresponds to 83/166 Hz. Frequencies in this range are usually mono, i.e., their share in the difference signal is low. A range of +/−3 ms covers nearly all such effects.

In intensity stereophonic signal constellations, for all mapped spots within the stereo base, the below rule applies:

$|\delta| \leq k_{IS}|\sigma|$ within a time window of $\tau_{IS}$     modified Rule 1:

with $k_{IS}$=amplitude factor in composite signals, for example, 1.4
with $k_{IS}$=amplitude factor in single tones, for example, 1.1*
with $\tau_{IS}$=peak hold time, e.g., +/−3 ms The modified rule 1 is in the time domain and in the frequency domain as follows:

a. Time domain: The difference signal is within an envelope. The envelope is based on the relative maxima/minima of the sum signal, multiplied by a factor of $k_{IS}$. Each newly detected and with $k_{IS}$ multiplied extreme value is kept within a time window of $\tau_{IS}$ (peak hold).
b. Frequency domain: At each frequency, the power of the difference signal is smaller than the power of the sum signal, or is at most equal to it.

This value (here, for example, 1.1) includes a level of imbalance of the receiver of 1 dB between the left and right channel. With of a factor k=1.0 and a level difference between the left and right audio output, the difference signal would otherwise be cut unnecessarily.

This results in the following signal processing:

Time Domain:

For each block, the disturbed difference signal is reduced to the envelope of the sum signal, wherein the envelope takes into account signal shifts and amplitude increases. To compute the envelope, the relative maxima/minima (momentary peak values) of the absolute value of the sum signal are held (peak hold), and the resulting signal is increased by the factor $k_{IS}$ (e.g., 1.4) for the range of the time offset $\tau_{IS}$ (e.g. −3/+3 ms).

It is necessary that the block length (in this case about 100 ms) covers the time difference between the extreme values of the sum and difference signals.

Frequency Domain:

The amplitude value of each spectral line of the disturbed difference signal is reduced to the value of the sum signal. The phase spectrum of the difference signal is unchanged and processed further.

4. Time Based Stereophony and Intensity Stereophony with Time Based Stereophonic Fractions (LS)

With pure time based stereophony, a sound source is recorded with displaced microphones. The sound travels different distances to the microphones, depending on the input direction. Within the microphone signals L and R, signals are formed that have a direction-dependent time delay. During reproduction, the human ear can determine the direction of the auditory event, and thereby locates the sound by the time difference between the left and right ear signals.

Figure 13:
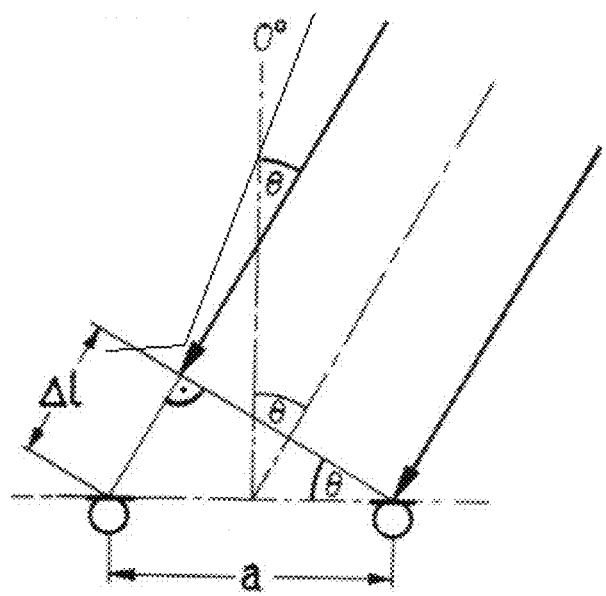
FIG. 13 shows an example of an AB microphone installation.

FIG. 13 shows an example of such an AB microphone installation.

For the path length difference, $\Delta l = a * \sin \Theta$ applies for the time difference, $\Delta t = \Delta l / c$ applies, with c=343 m/s, and the microphone distance a.

In practice, there is often no pure time-based stereophony, but an intensity stereophony with time-based stereophonic fractions, also referred to as equivalence stereophony. This manifests itself in different phase values in the spectra of the sum and difference signals, but also in non-simultaneous amplitude peaks in the time domain of both signals.

Recordings with time based stereophonic fractions are made for example in AB technology. The so-called Decca Tree is also used to reproduce complex sound bodies such as an orchestra, for example. Here, additional, laterally arranged supporting microphones are sometimes used. The sound from a source arrives at different microphones. Depending on the sound input direction and the arrangement of the microphones, individual levels and delay times are obtained for each microphone. The individual microphone signals are processed according to certain aspects, to a left and a right audio signal.

Depending on the sound input direction and the arrangement of the microphones, the following effects can be observed after matrixing:

An auditory event, which is reflected in the difference signal, is not completely equal to the sum signal, depending on the input direction of the sound wave.

The individual microphone signals are superimposed with their different time delays, and generate a statistical deviation of the amplitude of the difference signal compared with the sum signal. This is especially true for frequencies above the bass range, in which the individual time delay results in ambiguousness of the phase (1 m=3 ms=360 degrees at 332 Hz!).

However, when recording, attention is paid to mono-compatibility. That means, time delay differences are avoided between the microphone signals to prevent audible cancellation effects in the sum signal. Therefore, the intensity stereophonic portion in the signal predominates and the statistical amplitude distortion of the difference signal is limited.

This leads to rule 2 of the method according to the invention:

$|\delta| \leq k_{LS} |\sigma|$ within the time window of $\tau_{LS}$  Rule 2:

with $k_{LS}$=amplitude factor, e.g., 1.4
with $\tau_{LS}$=peak hold time, e.g., +/−3 ms Rule 2 is represented in the time and frequency domain as follows:
  a. Time domain: The difference signal is within an envelope. The envelope is based on the relative maxima/minima of the sum signal, multiplied by a factor of $k_{LS}$. Each newly detected and with $k_{LS}$–multiplied extreme value is kept within a time window of $\tau_{LS}$ (peak hold).
  b. Frequency domain: At each frequency, the power of the difference signal is smaller than the power of the sum signal, or is at most equal to it.

Rule 2 leads to the following processing of signals with time-based stereophonic fractions:

Frequency domain: Since time-shifted signals have the same magnitude spectra, the amplitude value (magnitude) of the disturbed spectral line of the difference signal can also be reduced in LS to the corresponding value of the sum signal spectrum. However, it is necessary that the block length (here, approximately 100 ms) covers the major time delay differences, i.e., that time-shifted signal components occur in the same block.

The phase spectrum is processed further, unchanged.

Time domain: For each block the disturbed difference signal is reduced to the envelope of the sum signal, wherein the envelope takes into account signal shifts and amplitude increases (especially with transients). To compute the envelope, relative maxima (momentary peak values) of the absolute value of the sum signal are held (peak hold), and the resulting signal is increased by the factor $k_{LS}$ (e.g., 1.4) for the time shift range $\tau_{LS}$ (e.g., −3/+3 ms).

Rules 1 and 2 can also be applied to frequency groups in the frequency domain. Thereby the powers of the individual spectral lines are considered summarized.

Rule 1 is the consideration for intensity stereophony. Rule 1b or Rule 2b is always applied for the implementation of the procedure.

5. Special Signal Constellations in LS

The method according to the invention also involves typical signal constellations during signal processing in the case of the time based stereophony:

Cancellations

When recording signals with time-based stereophonic fractions, frequency-selective cancellations (AL) can occur in the sum and the difference signal spectrum. Due to different signal path delays of the displaced microphones L and R, a cancellation happens, e.g., in the sum signal $\sigma=(L+R)/2$ if a frequency at microphone R undergoes a phase rotation of 180 degrees with respect to microphone L. In the difference signal $\delta=(L-R)/2$, a cancellation happens if a frequency of the microphone R undergoes a delay-dependent phase rotation of 0 degrees. A cancellation or destructive interference of sound waves in both signals at the same frequency can only occur if this frequency is derived from a variety of sound origins or input directions and both arrive at the microphones with equal amplitude. This is statistically unlikely. Usually, cancellations occur in both signals at different frequencies.

Figure 14:
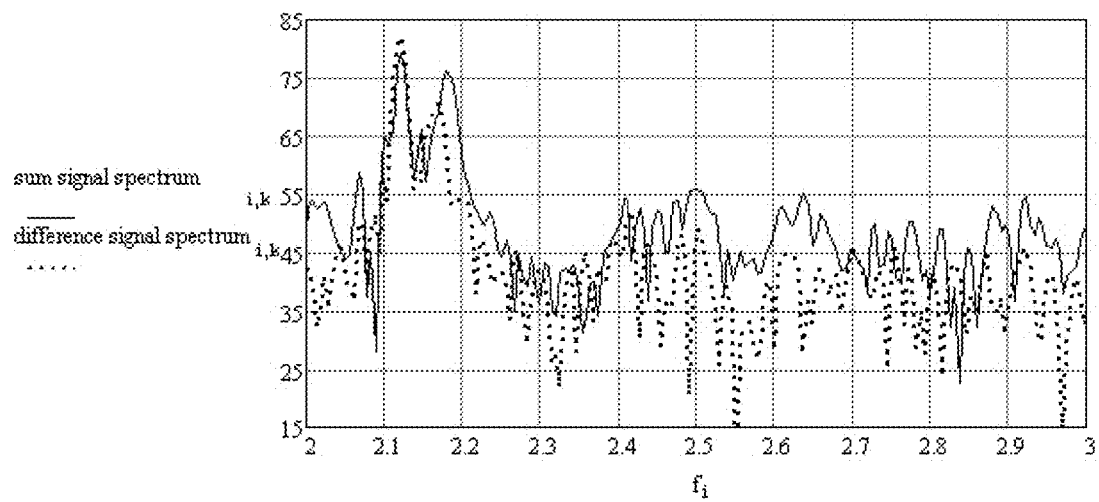
FIG. 14 shows the difference signal spectrum and cancellations in the sum signal spectrum at LS.

FIG. 14 shows an undisturbed difference signal spectrum at LS. Frequency-selective cancellations in the sum signal spectrum at 2.09 kHz and 2.83 kHz can be seen. Cancellations occur in both spectra at different frequencies.

A cancellation in the sum signal would decrease the difference signal spectrum severely at this frequency, in accordance with rule 2b, and may impair the sound of the undisturbed audio signal. If a narrow cancellation is identified, a gain reduction can be avoided.

Figure 15:
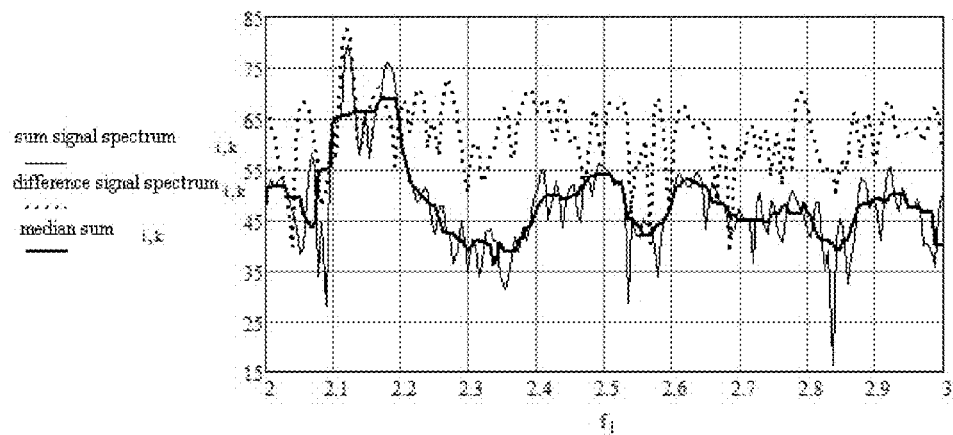
FIG. 15 shows the disturbed difference signal spectrum, which can be reduced to the median value of the sum signal spectrum.

However, in the case of cancellations in the sum signal spectrum, the unchanged value of the difference signal spectrum is not taken over, since this could be a pure interference signal of any magnitude. Instead, the value of the difference signal is reduced to the median value of the sum signal spectrum as shown in FIG. 15, showing a disturbed difference signal spectrum. Thus, the noise reduction remains in effect without distorting the useful signal.

Local level maxima

A local/frequency-selective maximum (LM) in the difference signal spectrum can arise during the recording of time-based stereophonic fractions by constructive interference of sound waves, whereas the sum signal does not reach this maximum. In this case, it would come to an undesirable level attenuation in accordance with rule 2b.

To avoid a level reduction, there is a check to see if the frequency-selective level maximum is associated with a higher frequency-selective SNR. If so, the level remains unchanged and is not lowered. Thereby it is assumed that the noise has a white spectrum in the extended surrounding of the level maximum and the frequency-selective level maximum projects beyond this.

However, this strategy fails in the case of noise with a frequency-selective spectrum. Therefore, the sum signal spectrum is taken into account as an additional criterion. Both the sum signal spectrum as well as the difference signal spectrum must extend with their frequency-selective maxima levels out of the spectral environment of the difference signal spectrum. Then you can assume that the frequency-selective level increase is resulting from the useful and not from the interfering signal.

As can be seen in FIG. 14, the sum signal spectrum and the difference signal spectrum disturbed by noise have each two maxima at 2.12 kHz and 2.17 kHz, which rise above the values of the closer environment (approximately 59 dB). It can therefore be assumed that both maxima result from the useful signal, and that the local SNR is high. These maxima of the difference signal spectrum may remain unchanged for further signal processing.

Figure 16:
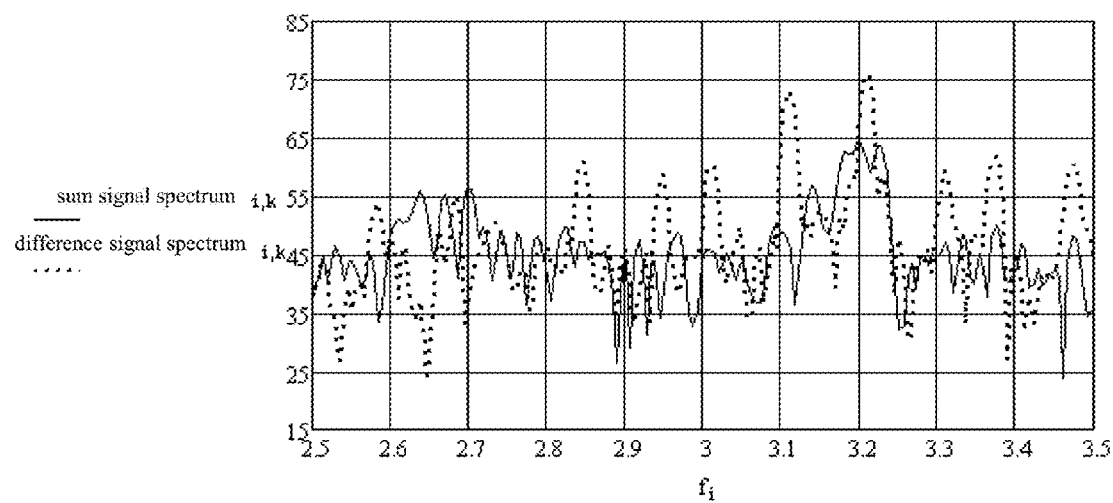
FIG. 16 shows a frequency-selective noise spectrum of the difference signal.

FIG. 16 shows a frequency-selective noise spectrum. However, the difference signal spectrum shows several spectral lines with a higher level that is not supported by the spectral lines of the sum signal. It can be deduced, therefore, that the high-level spectral lines of the difference signal originate from an interference signal. A reduction to the level of the sum signal spectrum can be carried out.

Local maxima are identified separately for the sum signal and the difference signal spectrum. The median-filtered difference signal spectrum can be seen in FIG. 17a. A maximum in one of the spectra exists when the spectrum exceeds its median value for a specified value in dB.

Figure 17A:
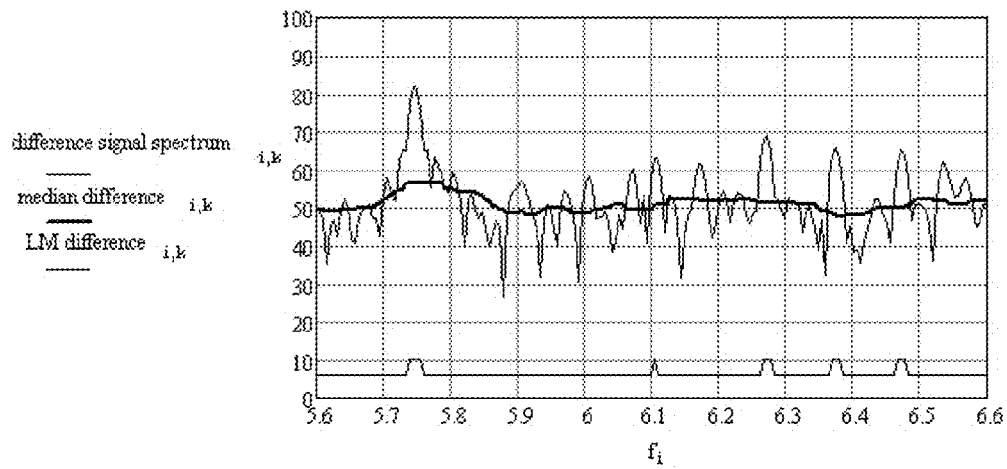
FIG. 17a shows the median-filtered difference signal spectrum and local maxima of the difference signal spectrum.
Figure 17B:
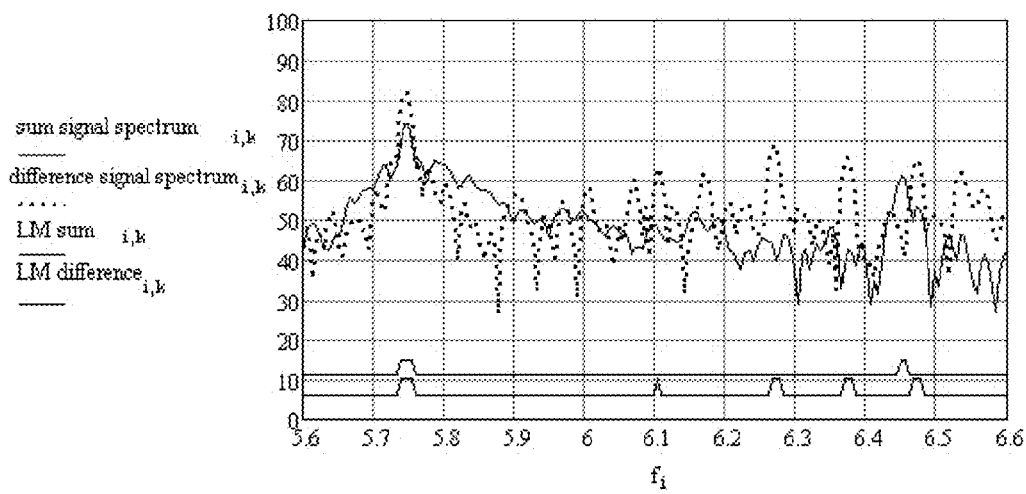
FIG. 17b shows the sum signal spectrum and the difference signal spectrum as well as local maxima of both spectra.

In FIGS. 17a and 17b, LMSumme and LMDifferenz (labels in the bottom of the screen) indicate the maxima of the sum signal spectrum or difference signal spectrum. If LMSumme lies within the bandwidth of LMDifferenz, a superordinate local maximum LM is reported, which causes a level reduction of the difference signal spectrum in the corresponding frequency bandwidth to be blocked. In the case of the example in FIG. 17b, this is true only for a narrow frequency band at 5.75 kHz.

Both cancellations (AL) and local maxima (LM) are identified by means of median filtering. Both cases are incorporated into the spectral correction function as non-linear signal processing. LM and AL contribute to the restoration of the undisturbed difference signal spectrum.

6. Identification of IS and LS

The identification of LS takes place via a cross-correlation (similarity analysis) of the sum and difference signals. The basic idea behind this is that the time difference of both signals is determined by the cross-correlation. If this is equal to zero, IS is present; otherwise, LS is present.

Complementarily or alternatively, an identification can take place in the frequency domain if cancellations occur in the sum and difference signals at different frequencies.

The cross-correlation function (KKF) is calculated from one block each of the sum signal and difference signal. In almost all recordings, including those with time-based stereophonic character, the low tones are monaural. They produce small phase differences at the different microphones, and generally dominate higher frequencies in the level. Time delays at higher frequencies are covered and not recognized by the KKF. In order to avoid this, the sum and difference signals are initially differentiated in time and only then is the KKF calculated. The differentiation in the time domain corresponds to an increase in the level to higher frequencies in the frequency domain.

The KKF is calculated independently of the level by determining the covariance function (KOV) (for formulas see appendix). Maxima can be identified by subsequent calculation of the absolute value independently of the signal polarity. Maxima are shown at such time shifts, in which the differentiated sum and difference signals show similarities. In the case of pure IS, the maximum shows up at the time shift zero. More KOV maxima may occur when both signals have inner similarities: the difference signal is often an attenuated copy of the sum signal. To hide these maxima, the autocovariance (AKOV) of the sum signal is calculated and subtracted from the scaled to 1 KOV covariance. If the difference (delta KOV) exceeds a certain threshold value, LS is present; otherwise, IS is present.

Figure 18A:
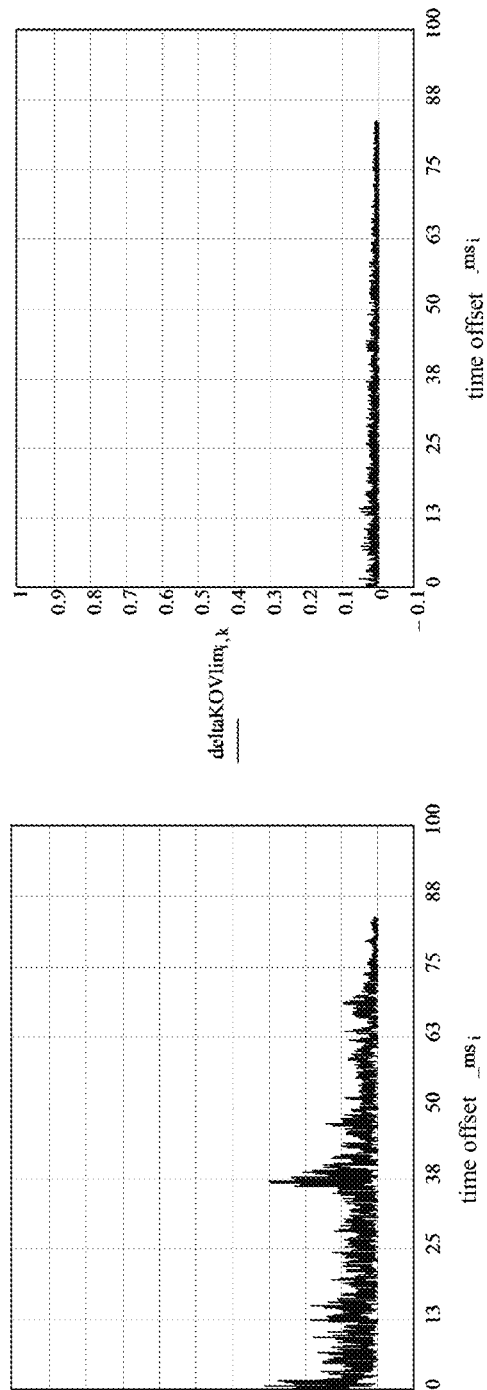
FIGS. 18a and 18b show typical delta KOV at LS (18a) and IS (18b).
Figure 18B:
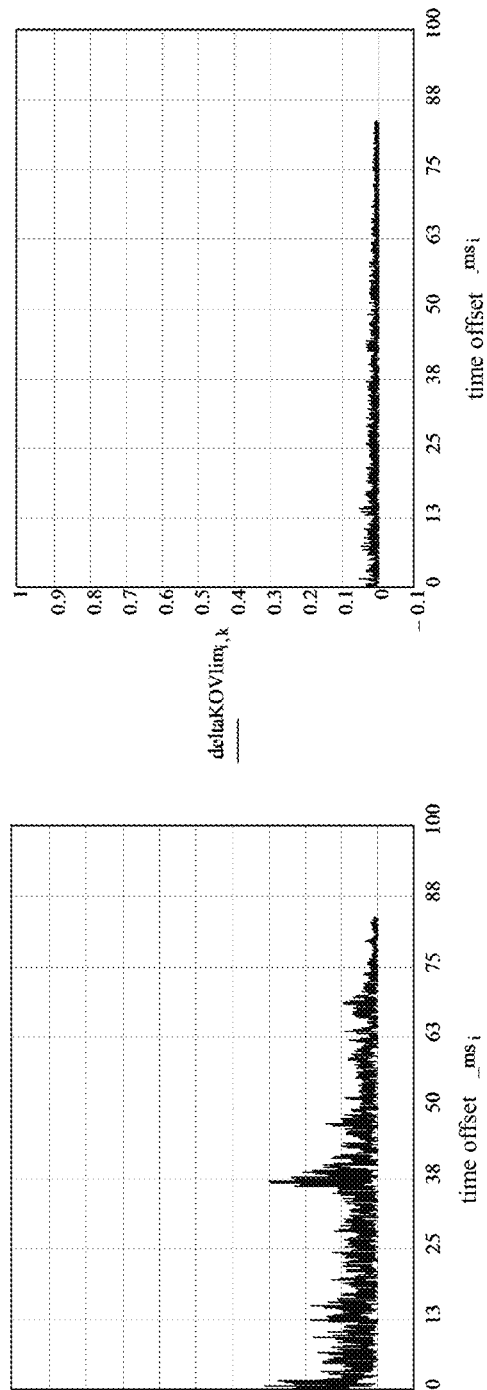

FIGS. 18a and 18b show typical delta KOV at LS (18a) and IS (18b).

In the case of superimposed disturbances, the above-mentioned method does not provide reliable detection of time-based stereophonic delays between sum and difference signals in each block. Disturbances change the time course of the difference signal, lead to dissimilarity of sum and difference signals, and consequently reduce the level of delta. Thus, in order to avoid the occurrence of disturbance-related IS/LS fault decisions, the signal-to-noise ratio (SNR) is considered block by block. The SNR is here defined as the ratio of the power of the sum signal and difference signal. Should the SNR decrease below a threshold value in a block (making the IS/LS-decision unreliable), the decision of the last block with a high SNR is used. The starting value LS is predetermined.

7. Signal Classification and Temporal Processing

Audio signals can have a transient or stationary character. Transient signals are characterized by an increase in power within the shortest periods of time, often associated with preceding signal pauses or silent passages. Stationary signals have a more continuous power timeline.

Interference can most effectively be reduced in the frequency domain if the magnitude spectra of the useful signal and that of the interfering signal differ significantly.

Unfortunately this does not apply to transient useful signals (such as guiro and castanets) because they have an almost white spectrum and there is little difference to the noise as interfering signal. A reduction in selective frequencies can hardly take place. The residual noise is therefore high in such cases. Further disturbances are added: The processing of noise in the frequency domain and transformation back into the time domain causes an alias, spread out over the block. It is mostly hidden for stationary useful signals.

As long as the transient useful signal is present, residual noise is masked simultaneously. Residual noise that occurs after a transient can be better masked, because the natural transient signals settle more slowly, and hearing has temporal post-masking. The masking of residual noise, which precedes a transient, is lower. In signal pauses before a transient noise, a so-called pre-echo can be audible.

Figure 19:
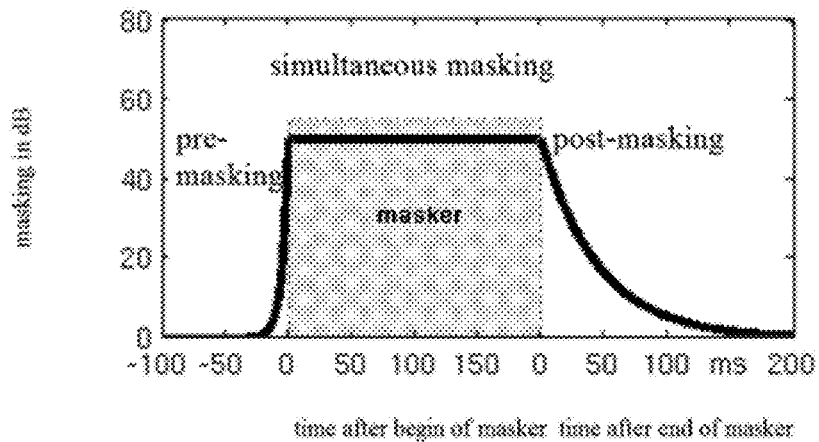
FIG. 19 shows the masking in the time domain ("temporal masking").

FIG. 19 shows the masking in the time domain ("temporal masking").

If the useful signal has a transient/impulse character and noise is superimposed on the difference signal, then the residual noise can be reduced (the pre-echo amongst others), by an additional signal processing in the time domain (temporal processing). The difference signal is herewith limited to the envelope of the sum signal (clipping).

The following images using an example of a transient signal show how a temporal processing reduces pre-echoes.

Figure 20:
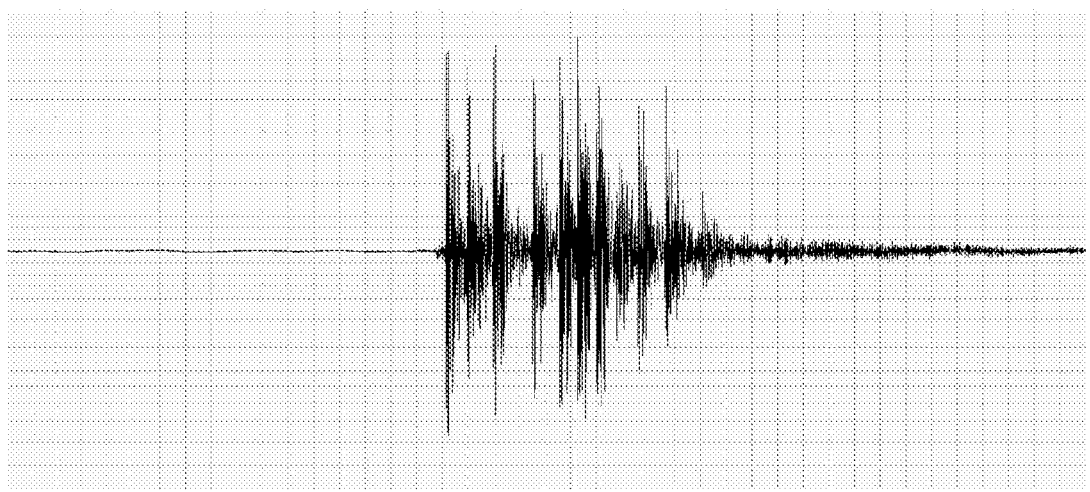
FIG. 20 shows the time course of an undisturbed guiro without signal processing.

FIG. 20 shows an undisturbed guiro without signal processing, i.e., the original signal.

Figure 21:
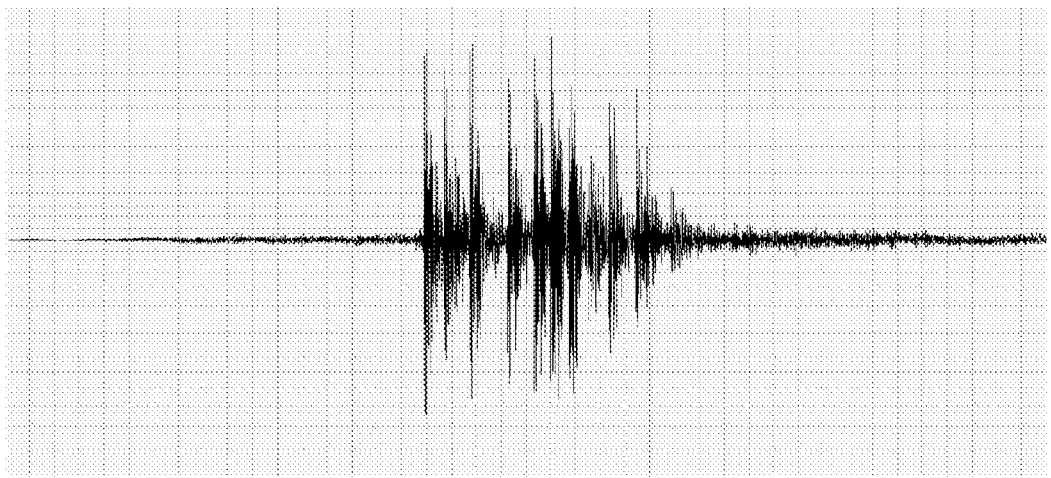
FIG. 21 shows the time course of a noisy guiro after signal processing in the frequency domain.

FIG. 21 shows a noisy guiro after signal processing in the frequency domain. A pre-echo is present.

Figure 22:
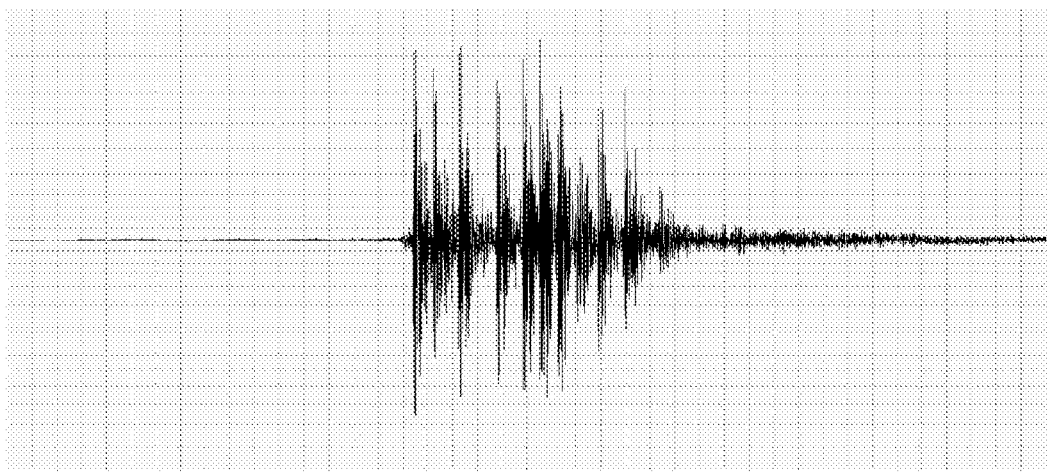
FIG. 22 shows the time course of the noisy guiro after signal processing in the time and frequency domain.

FIG. 22 shows the noisy guiro after signal processing in the time and frequency domain. The pre-echo is significantly reduced.

If the useful signal is transient and/or short signal pauses are present within the block, then clipping can also help to temporally eliminate or reduce disturbances with a transient character.

The limiting to the envelope curve reduces the interfering energy in the case of strong disturbances. In these cases, the magnitude spectrum of the difference signal after clipping lies below that of the untreated magnitude spectrum. The effect of the original disturbance on the magnitude and phase of spectral lines is reduced.

On the other hand, the clipping itself produces noise with a white spectrum, which manifests itself as interferent portions in the magnitude and the phase of the difference signal spectrum. This effect increases the more signal components are cut off. If it comes to a level increase in spectral lines in this regard, this can be corrected by the signal processing in the frequency domain. Level reductions cannot be corrected.

The distorted phase spectrum is taken on unchanged.

It is therefore necessary to decide from block to block whether the limiting to the envelope curve is to be applied.

8. Criterion for the Use of Temporal Processing

If the sum signal (useful signal) is stationary, or if it has a temporally continuous signal form, its frequency spectrum usually provides sufficient gaps for an effective selective interference reduction in the frequency domain of the difference signal. In the case of stationary signals, the temporal processing (limiting to the envelope curve) worsens the residual noise and thus also the channel separation. Therefore it is better to turn off temporal processing in this case.

In contrast, if the transients dominate or signal pauses exist within the signal, it is advantageous to additionally use temporal processing. In these instances, the temporal processing reduces the pre-echoes, in particular. Pre-echoes occur as a form of alias after the IFFT, are distinguishable in the signal pause before a transient, and may be audible without temporal processing. In the case of stationary signals, the alias after the IFFT is usually masked by the continuous signal form.

From this follows Rule 3:

Rule 3: Temporal processing (limiting to the envelope curve) is turned on, if in the sum signal (useful signal) transients dominate or when there are pauses within the signal.

It is useful to already check for the condition within the time domain, since a limiting to the envelope curve is, before the signal processing, in the frequency domain.

For identification of transients, the envelope of the sum signal $\sigma$ is examined. A transient is considered identified if the envelope curve increases by more than x percent within a time segment $\Delta t$. Determination in percentages allows for level-independent identification.

9. Signal Processing 9.1. Signal Processing in the Time Domain, Part 1 (the Sequence of Steps 1 and 2 is Interchangeable).

1. Block forming of the audio sample values for the right and left channel. An overlapping block structure is produced. The overlap is, e.g., 50%. The block length is, e.g., 4096. The following processing steps apply per block.
2. Matrixing the channels L and R into $$\sigma=(L+R)/2 \text{ and } \delta=(L-R)/2$$

(alternatively direct processing of the sum signal $\sigma$ and difference signal $\delta$)

3. Signal analysis and limiting to the envelope
3.1 Identification of LS or IS on the basis of $\sigma$ and $\delta$
   3.1.1 Temporal derivative of $\sigma$ and $\delta$ Blocks d$\sigma$ and d$\delta$ are created
   3.1.2 Calculation of the 1-normalized absolute value of the covariance of d$\sigma$ and d$\delta$: absKOVnorm
   3.1.3 Calculation of the absolute value of the autocovariance of d$\sigma$: absAKOV
   3.1.4 Calculation of the difference
   deltaKOV=absKOVnorm−absAKOV
   3.1.5 Temporal limitation of deltaKOV to an upper limit (here, 3 ms):
   deltaKOVlim is generated
   3.1.6 Calculation of the maximum of deltaKOVlim
   3.1.7 Identification of LS or IS:
   Verification of SNR:
   if rootSNR<rootSNR$_{thresh}$ (or if SNR<SNR$_{thresh}$ {e.g. 0.3}):
      the LS/IS-decision of the previous block is adopted
   else:
      if max (deltaKOV)<kovlevel (e.g. kovlevel<0.1):
         IS
      else: LS 3.1.8 Calculation of the envelope of $\sigma$ regarding the values of the time shift $\tau$ and of the amplitude factor Ampf, e.g.:

$$LS: \tau_{LS}=+/-3.0 \text{ ms } k_{LS}=1.4$$

$$IS: \tau_{IS}=+/-3.0 \text{ ms } k_{IS}=1.4$$

3.1.9 Identification of transients and limiting of $\delta$:
   Calculation of the percentage increase (PA) of the envelope of $\sigma$ within a time interval of n samples.
   if PA<x %: stationary signal
   else: detected transient, limiting the signal $\delta$ to the envelope of $\sigma$
3.2 Weighting of each block with an analysis window function (here, root-Hanning):
   The weighted blocks w$\sigma$ and w$\delta$ are created.
9.2 Signal Processing in the Frequency Domain
4. Zero-padding ** of the weighted blocks w$\sigma$ and w$\delta$.
5. Transformation into the frequency domain. Outcome is the spectra W$\Sigma$(f) and W$\Delta$(f).
6. Separation into magnitude and phase spectra.
7. Calculation of the spectral correction function K(f) (see annex).
8. Multiplication of the magnitude spectrum of W$\Delta$(f) by correcting function K(f) in the linear measure.
9. Calculation of the corrected complex spectrum of W$\Delta$(f).
10. Inverse transformation into the time domain. Outcome is a corrected difference signal $\delta$(t).
   Padding the block with zeros to the desired length (power of 2 for FFT)
9.3 Signal Processing in the Time Domain, part 2
11. Multiplication of the block with a synthesis window function (here, root-Hanning).
12. Overlap add of blocks
13. Dematrixing of $\sigma$ and the corrected $\delta$ into the channels L and R Annex A/Formulas:

Hanning Window (Analysis and Synthesis Window Function)

$$H(n,N)=0.5-0.5 \cos\{(2\Pi n/(N-1)\} \text{ where } N=\text{number of samples per block}$$

$$\text{root Hanning}=\sqrt{H(n,N)}$$

Signal to Noise Ratio SNR within a Block:

$$SNR=P_{w\sigma}/P_{w\delta} \text{ with } P=\text{power=rootSNR}=\sqrt{SNR}$$

Covariance KOV and Autocovariance AKOV:

$$\text{Mean value } m(x) := \frac{1}{n} \cdot \sum_{i=0}^{n} x_i$$

$$\text{Variance } var(x) := \sum_{i=0}^{i_{max}} \frac{(x-m(x))^2}{i_{max}-1}$$

$$\text{Standard deviation } stdev(x) := \sqrt{var(x)}$$

$$\text{Covariance } kov(\sigma, \delta)_i := \sum_k \left[(\sigma_k - m(\sigma)) \cdot (\delta_{i+k} - m(\delta)\right]$$

$$\text{Normalized covariance } KOV(\sigma, \delta)_i := \frac{kov(\sigma, \delta)_i}{i_{max} \cdot stdev(\sigma) \cdot stdev(\delta)}$$

$$\text{Autocovariance } AKOV(x)_i := KOV(x, x)_i$$

Spectral Correction Function K (f) Considering the Spectra on a Linear Scale:
  local level maxima in the difference signal spectrum:
    For LS:
      Calculating the median filtered sum signal spectrum $W\Sigma(f)_{median}$ and difference signal spectrum $W\Delta(f)_{median}$
      Determining the frequencies $f_{LM\ Diff}$ with local level maxima (>$LM_{Diff}$ dB) in $W\Delta(f)$
      Determining the frequencies $f_{LM\ sum}$ with local level maxima (>$LM_{sum}$ dB) in $W\Sigma(f)$
      if in a contiguous range of $f_{LM\ Diff}$, a frequency $f_{LM\ sum}$ occurs, then $K(f)=1$ otherwise:

if $|W\Delta(f)|>|W\Sigma(f)|:K(f)=|W\Sigma(f)|/|W\Delta(f)|$ if $|W\Delta(f)|\leq|W\Sigma(f)|:K(f)=1$ for IS:

if $|W\Delta(f)|>|W\Sigma(f)|:K(f)=|W\Sigma(f)|/|W\Delta(f)|$ if $|W\Delta(F)|\leq|W\Sigma(f)|:K(f)=1$ Cancellations in the Sum Signal Spectrum:
  For LS:
    Calculating the median filtered sum signal spectrum $W\Sigma(f)_{median}$
    Identifying the frequencies $f_{AL}$, for which time-delay-dependent cancellations (narrow dips) take place in $W\Sigma(f)$.
    if $f=f_{AL}$ $K(f)=W\Sigma(f)_{median}$
    else f:

if $|W\Delta(f)|>|W\Sigma(f)|:K(f)=W\Sigma(f)|/|W\Delta(f)|$ if $|W\Delta(f)|\leq|W\Sigma(f)|:K(f)=1$ For IS:

if $|W\Delta(f)|>|W\Sigma(f)|:K(f)=|W\Sigma(f)|/|W\Delta(f)|$ if $|W\Delta(f)|\leq|W\Sigma(f)|:K(f)=1$ The method according to the invention reduces noise and other types of interference that occur in the difference signal and disturbances that exceed the sum signal. Interferences include those caused by the transmission chain after matrixing in the stereo coder up to the FM demodulator in the receiver, e.g., inherent noise of the FM transmitter; radio transmission interference; noise due to low power of the receiving antenna; the inherent noise in the RF part of the receiver; RF-adjacent channel and co-channel interference; quantization noise of the ADCs in the IF-range of the receiver; non-linear distortion products due to the limitation of the IF bandwidth (as long as they are not within the sum channel); disturbances due to signals of purely digital or hybrid transmission systems, such as IBOC, HD Radio and FMeXtra; and disturbances and crosstalk within hybrid systems, which have an impact on the difference signal of the analog transmission system.

Interference that occurs in the sum channel, i.e., also in the case of pure mono-reception, cannot be eliminated by this method. This includes adjacent channel interference, which can particularly cause brief but strong disturbances during mobile reception.

The improvements mentioned also refer to the applied FM variant SSBSC in the USA. The invention approach is fully compatible with SSBSC.

The method was simulated and emulated in this exemplary embodiment with a mathematical program on a PC.

Referring to the block diagrams according to FIGS. 23a to 25, an exemplary embodiment of the method according to the invention is to be explained.

Figure 23A:
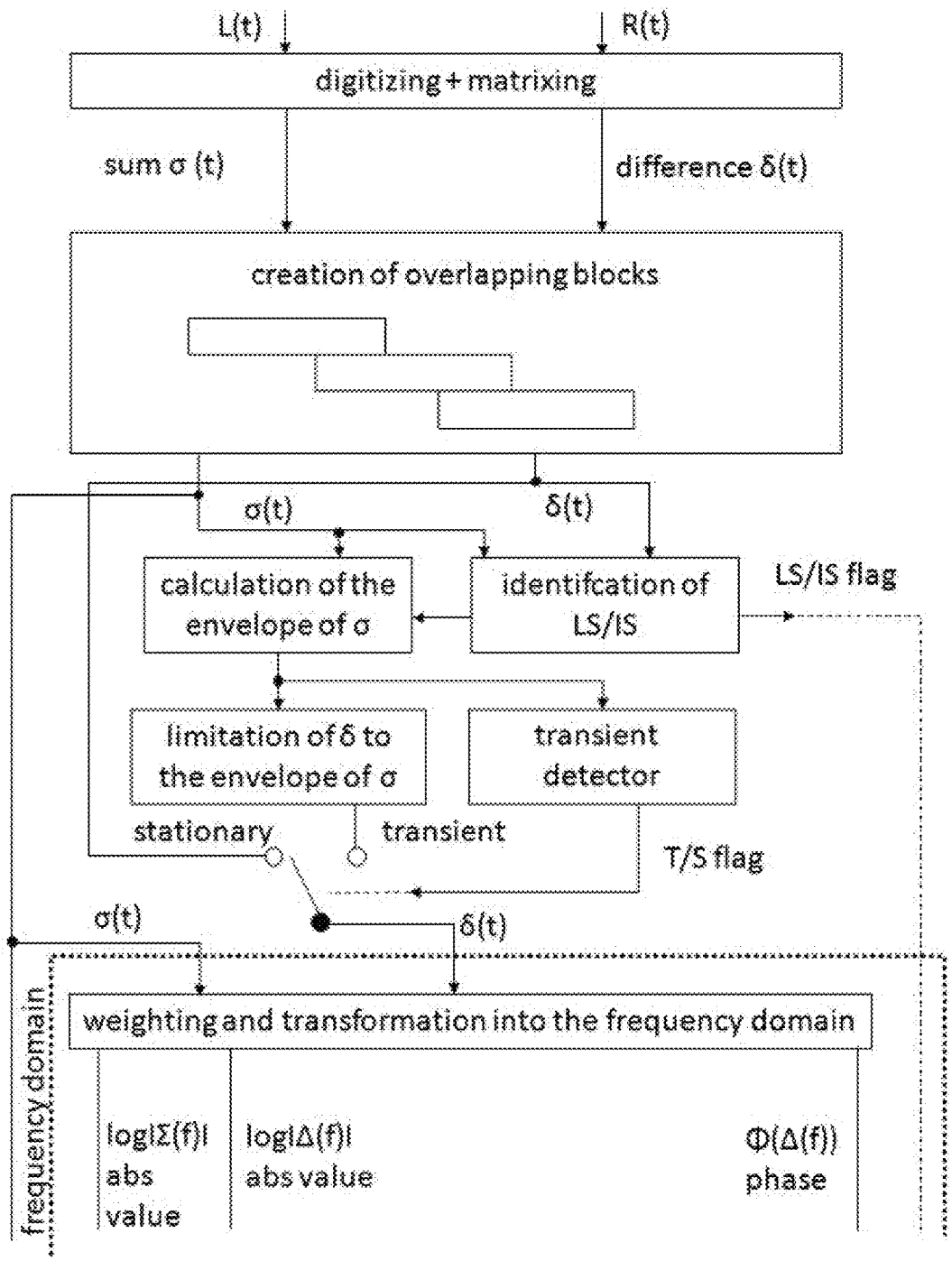
FIG. 23a shows the overall view of the signal processing, predominantly in the time domain, as a block diagram.

As shown in FIG. 23a, the analog FM stereo signal is first digitized and matrixed. For a receiver with digital signal processing, the already-digitized signal can be used.

The signal is divided into a sum signal and a difference signal in the time domain, and weighted, overlapping blocks are generated. The weighting can, for example, be carried out using the Hanning function (window function).

The sum signal is used both for the calculation of the envelope curve and for the identification of time-based stereophony (LS) and intensity stereophony (IS).

The identification of LS and IS preferably takes place, as previously described, by means of a correlation analysis.

The difference signal can be lowered to the envelope curve of the sum signal.

For this purpose, according to a preferred embodiment of the invention, a transient detection is provided, which decides whether it is a transient or stationary signal. In the case of a stationary signal, a limiting to the envelope is not performed and the unchanged difference signal is used immediately.

The transient signal, on the other hand, is subjected to the limitation to the envelope curve of the sum signal.

Then, both the sum signal and the difference signal are transformed from the time domain into the frequency domain.

The frequency range, or the part of the method in which the processing takes place in the frequency domain, is marked in this block circuit diagram in the dotted frame, which is characterized by frequency range.

There is now a sum signal spectrum which has an amount as well as a difference signal spectrum, which also has an amount.

The phase of the difference signal spectrum is processed further unchanged.

Figure 23B:
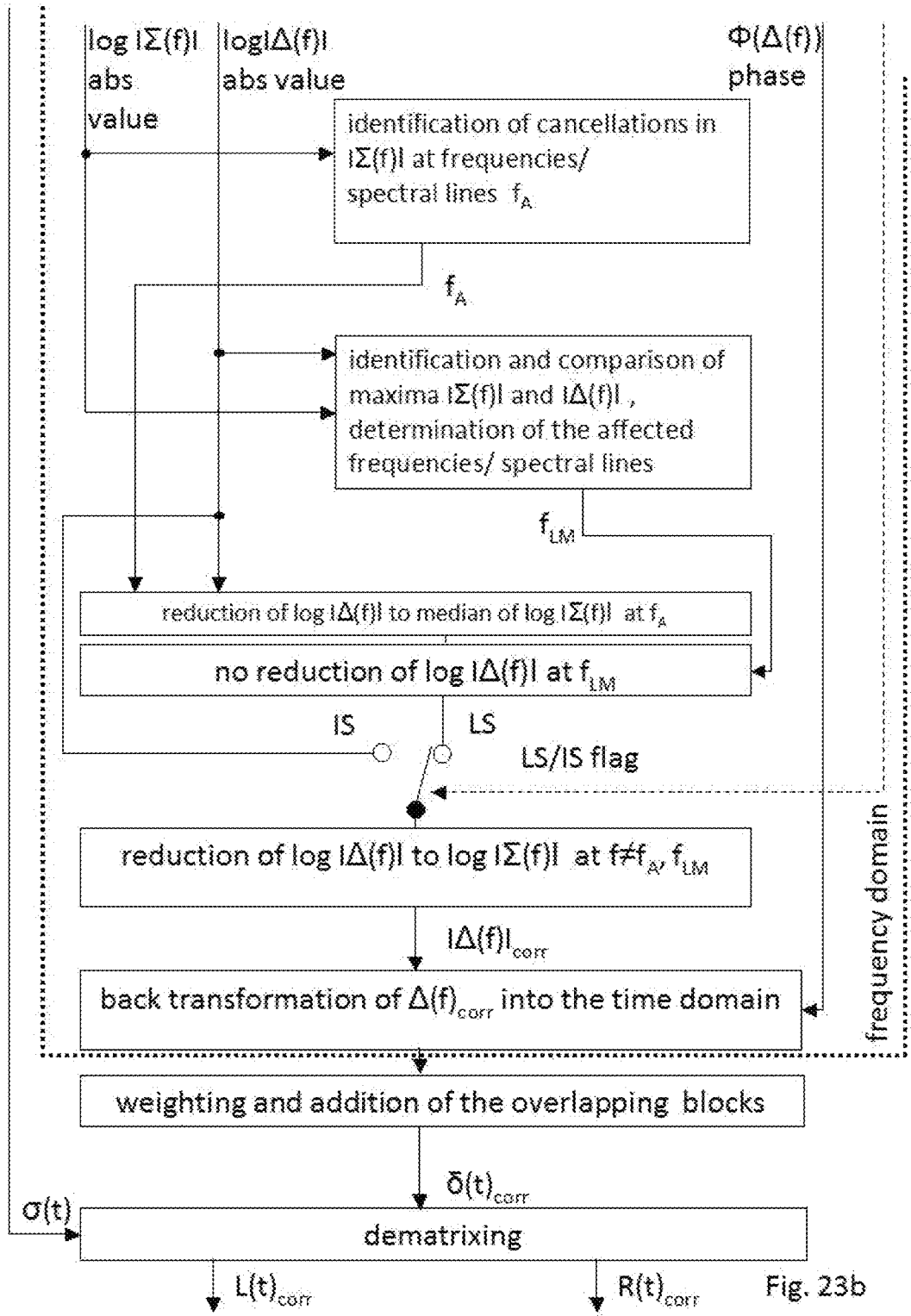
FIG. 23b shows the overall view of the signal processing, predominantly in the frequency domain, as a block diagram.

As shown in FIG. 23b, cancellations at certain frequencies are identified over the sum signal spectrum.

The affected frequencies or spectral lines can be defined by means of an identification and comparison of the maxima of the sum signal spectrum and the difference signal spectrum.

At cancellations, the difference signal spectrum is reduced to the median value of the sum signal spectrum.

The identification of cancellations is explained below with reference to FIG. 24.

Identification and comparison of the maxima is explained below with reference to FIG. 25.

In the case of intensity stereophony, the difference signal spectrum is directly processed further without the need for identifying cancellations and local maxima, or the need to use the identification process in this exemplary embodiment.

For all frequencies that are not identified, rule 1 is executed in the frequency domain and the difference signal spectrum is reduced to the sum signal spectrum.

A corrected difference signal spectrum is generated. This is transformed back into the time domain using the phase spectrum.

After weighting and combining the overlapping blocks in the time domain, a corrected difference signal is generated.

The sum signal and the corrected difference signal are dematrixed and a corrected stereo signal is generated.

Figure 24:
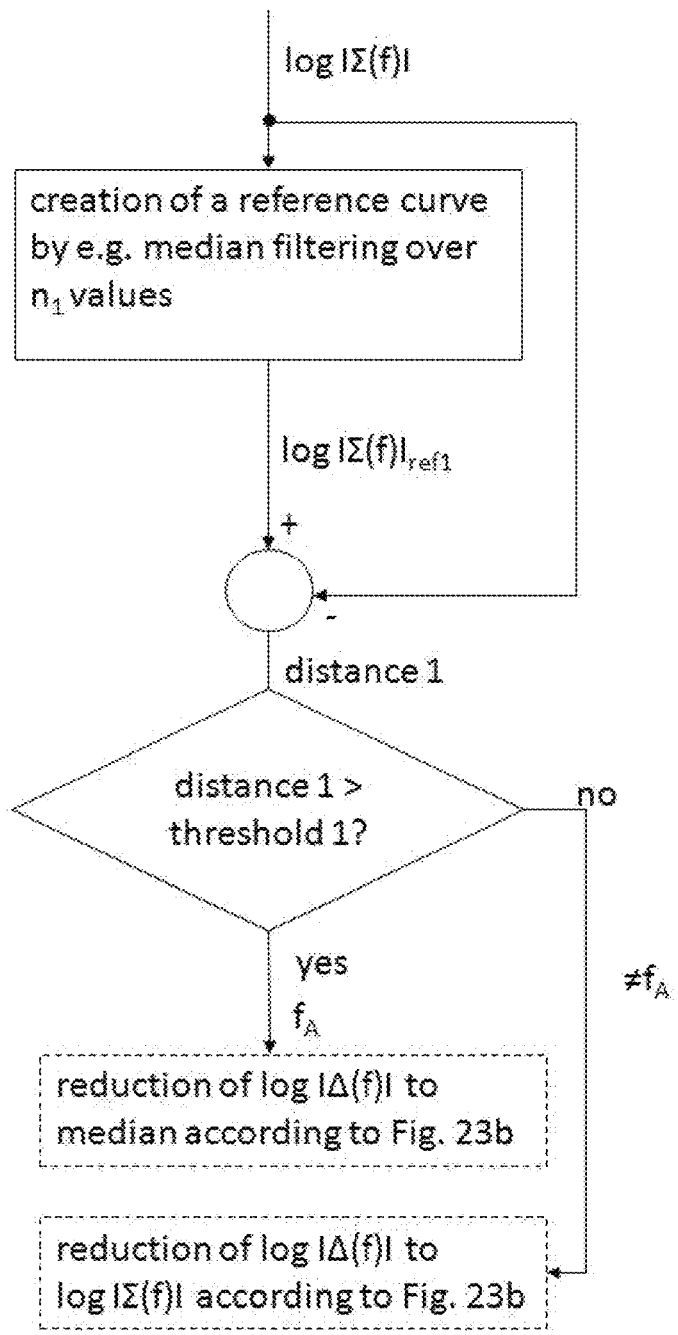
FIG. 24 shows an embodiment of the identification of cancellations in the sum signal spectrum shown as a block in FIG. 23b.

FIG. 24 shows an embodiment of the identification of cancellations shown as a block in FIG. 23b.

The logarithmized sum signal spectrum is compared with its median curve. If the difference is above a threshold value, the difference signal spectrum is reduced to the respective median value. If not, rule 1 applies and the difference signal spectrum is reduced to the sum signal spectrum as shown in FIG. 23b.

FIG. 25 shows the identification of the maxima depicted in FIG. 23b.

Both the logarithmized sum signal spectrum and the logarithmized difference signal spectrum are subjected to a median filtering.

If the respective difference is above a threshold value, a maximum can be identified.

If a maximum of the sum signal spectrum is within the frequency bandwidth of the maximum of the difference signal spectrum, the difference signal spectrum is not lowered for this frequency bandwidth.

By means of the invention, a reduction of disturbances of a stereo signal can take place, so that this reaches approximately the quality of the monosignal.

What is claimed is:

1. A method for processing an FM stereo signal, comprising the following steps:
   digitizing the analog FM stereo signal as a sum and difference signal;
   dividing the digitized signal into overlapping blocks;
   transforming the overlapping blocks into a frequency domain;
   comparing spectral lines of a difference signal spectrum with spectral lines of a sum signal spectrum;
   lowering at least the spectral lines of the difference signal spectrum, if these, in each case, have a higher magnitude than a respective spectral line of the sum signal spectrum;
   transforming back the sum and difference signal spectrum and merging the overlapping blocks.

2. The method for processing the FM stereo signal according to claim 1, characterized in that, if the width of a relative minimum of the spectrum of the sum signal is below a threshold value and the depth exceeds a threshold value and there is thus a cancellation, the spectral lines of the difference signal are not lowered or less lowered.

3. The method for processing the FM stereo signal according to claim 2, characterized in that differences in the time between sum and difference signals or between parts of both signals are determined by means of a similarity analysis or by means of a correlation in the time domain or frequency domain, and that the steps according to claim 2 are carried out in case of differences in time.

4. The method for processing the FM stereo signal according to claim 2, characterized in that, in case of a cancellation of a spectral line of the sum signal spectrum, the spectral line of the difference signal spectrum is only lowered to a spectral substitute value of the sum signal spectrum.

5. The method for processing an FM stereo signal according to claim 4, characterized in that the spectral line of the difference signal spectrum is lowered to a median value of the sum signal spectrum.

6. The method for processing the FM stereo signal according to claim 1, characterized in that, in a range of a local maximum of the difference signal spectrum, the difference signal spectrum is compared with the sum signal spectrum and the difference signal spectrum is not lowered in this range if a maximum of the sum channel spectrum lies within the frequency bandwidth of the maximum of the difference signal spectrum.

7. The method for processing an FM stereo signal according to claim 6, characterized in that differences in the time between sum and difference signals or between parts of both signals are determined by means of a similarity analysis or by means of a correlation in the time domain or frequency domain, and that the steps according to claim 6 are carried out in case of differences in time.

8. The method for processing the FM stereo signal according to claim 1, characterized in that the difference signal in the time domain is limited to an envelope curve of the sum signal whose maxima/minima are held (peak hold) for a period of time before and after the peak entry time, and the thus-changed envelope curve of the sum signal is multiplied by a factor greater than 1.

9. The method for processing the FM stereo signal according to claim 8, characterized in that the limitation of the difference signal in the time domain to the envelope curve of the sum signal is only performed when a transient character of the signal is detected via an evaluation of the sum signal or its envelope curve.

10. The method for processing the FM stereo signal according to claim 1, wherein the digital signal processing is performed such that the FM stereo signal is viewed so that its signal portions can only be located within the stereo base.

11. A consumer electronics device or smartphone, comprising means for carrying out the method according to claim 1.

12. The consumer electronics device or smartphone according to claim 11, wherein the means for carrying out the method comprise an application-specific integrated circuit (ASIC) or a logical circuit programmed according to claim 1.

13. The method for processing an FM stereo signal according to claim 1, wherein the spectral lines of the difference signal spectrum are lowered to the magnitude of the respective spectral line of the sum signal spectrum.

* * * * *